(12) United States Patent
Onishi et al.

(10) Patent No.: US 7,800,050 B2
(45) Date of Patent: Sep. 21, 2010

(54) HOLDING STRUCTURE FOR OPTICAL ELEMENT INCLUDING AN ELASTIC BIASING SECTION AND A DISPLACEMENT RESTRICTING SECTION (AS AMNEDED)

(75) Inventors: Satoshi Onishi, Amagasaki (JP); Atsushi Matsuura, Sakai (JP); Shinichi Suzuki, Izumi (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 485 days.

(21) Appl. No.: 12/002,214

(22) Filed: Dec. 14, 2007

(65) Prior Publication Data

US 2008/0156956 A1 Jul. 3, 2008

(30) Foreign Application Priority Data

Dec. 27, 2006 (JP) .............................. 2006-351829

(51) Int. Cl.
 *H01J 5/02* (2006.01)
(52) U.S. Cl. ...................................... 250/239; 250/221
(58) Field of Classification Search ................. 250/239, 250/221, 548; 353/119, 100, 101, 79; 359/696, 359/658, 529, 694, 813–820; 247/476–478, 247/573–579, 593–595
See application file for complete search history.

(56) References Cited

U.S. PATENT DOCUMENTS 4,712,897 A * 12/1987 Crema ........................ 396/373

FOREIGN PATENT DOCUMENTS

| JP | 2000-231077 A | 8/2000 |
| JP | 2002-228905 A | 8/2002 |
| JP | 2003-344950 A | 12/2003 |

* cited by examiner

*Primary Examiner*—Que T Le
(74) *Attorney, Agent, or Firm*—Sidley Austin LLP

(57) ABSTRACT

Pressure spring pieces elastically bias a free-form curved mirror such that the free-form curved mirror is pressed against positioning sections and positioned thereby. Displacement restricting sections are disposed opposite to the pressure spring pieces with respect to the free-form curved mirror in biasing directions of the pressure spring pieces with gaps. The gaps are set such that deformation of the pressure spring pieces remain within an elastic range when the free-form curved mirror moves against biasing forces of the pressure spring pieces to come into contact with the displacement restricting sections.

15 Claims, 18 Drawing Sheets

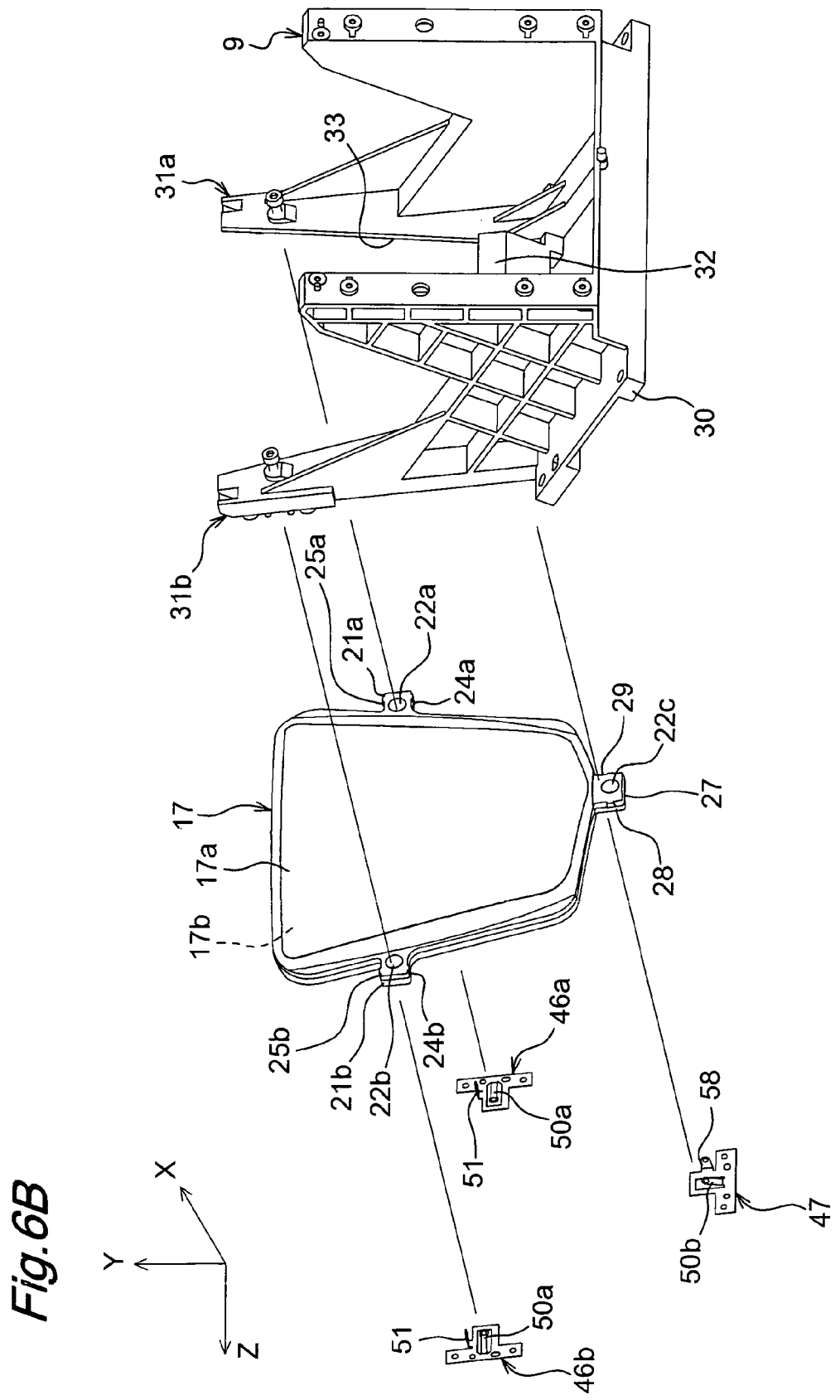

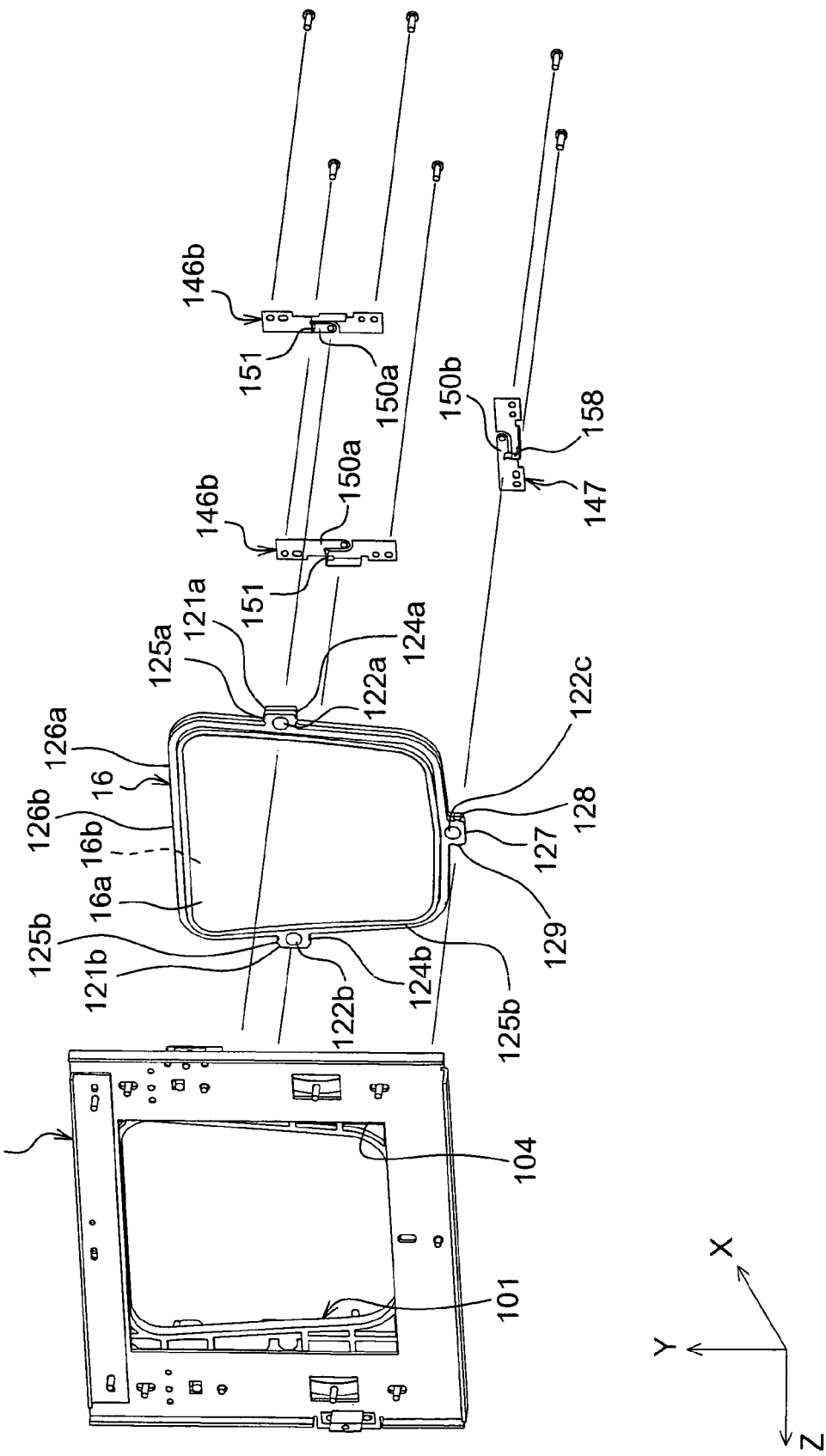

HOLDING STRUCTURE FOR OPTICAL ELEMENT INCLUDING AN ELASTIC BIASING SECTION AND A DISPLACEMENT RESTRICTING SECTION (AS AMNEDED)

RELATED APPLICATION

This application based on Japanese Patent Application No. 2006-351829 the contents in which are incorporated herein by reference.

BACKGROUND OF THE INVENTION

The present invention relates to a holding structure for an optical element such as a mirror or a lens.

Japanese Patent Application Laid-open Publication 2000-231077 discloses a holding structure for an optical element (integrator lens). In the holding structure, the optical element is elastically biased by a biasing member such as a plate spring so as to be pressed against positioning means provided in a unit case, thereby positioning of the optical element is achieved.

However, the holding structure has low reliability against external impacts and the like. The biasing force by the biasing member is preferably as weak as possible to prevent distortion of the optical element. However, if a large load due to an impact caused by falling or the like acts on the biasing member in a direction opposite to the direction in which the optical member is elastically biased, the weak biasing force may cause deformation of the biasing member exceeding elastic range and reaching plastic range. Once the deformation reaching the plastic range, the biasing member does not return completely to its original shape and residual distortion remains even when the load is ceased. As a result, the biasing force on the optical element positioning means becomes insufficient to appropriately hold the optical element. Especially, remarkable deformation of the biasing member may severely change posture of the optical element.

SUMMARY OF THE INVENTION

An object of the present invention is to provide a holding structure that can hold an optical element with a high degree of reliability even against a relatively large load acting on the optical element due an impact caused by falling or the like.

A first aspect of the present invention provides a holding structure for an optical element comprising, an elastic biasing section for elastically biasing an optical element, a positioning section disposed opposite to the elastic biasing section with respect to the optical element in a biasing direction of the elastic biasing section, the optical element being pressed against the positioning section by the elastic biasing section so as to be positioned, and a displacement restricting section disposed opposite to the positioning section with respect to the optical element in the biasing direction and opposed to the optical element in the biasing direction with a gap, wherein the gap is set such that deformation of the elastic biasing section remains within an elastic range when the optical element moves against a biasing force of the elastic biasing section to come into contact with the displacement restricting section.

The displacement restricting section is provided so as to be opposed to the optical element with the gap. Further, the gap is set such that deformation of the elastic biasing section remains within the elastic range when the optical element moves against the biasing force of the elastic biasing section to come into contact with the displacement restricting section.

Therefore, even when a large load acts on the optical element in the opposite direction to the biasing direction of the elastic biasing section due to an impact caused by falling or the like, displacement of the optical element is restricted due to contact with the displacement restricting section. Further, the deformation of the elastic biasing portion at this time remains within the elastic range and does not enter a plastic range. Accordingly, when the load is ceased, the elastic biasing section returns to its original shape with no residual distortion, thereby secure holding of the optical element is achieved. Therefore, the holding structure of the present invention is capable of holding the optical element with a high degree of reliability even against a relatively large load acting on the optical element due an impact caused by falling or the like.

The manner in which the positioning section and displacement restricting section contact the optical element may be any of point contact, line contact, and surface contact.

A second aspect of the present invention provides a projection unit provided with the above-mentioned holding structure for the optical element.

BRIEF DESCRIPTION OF THE DRAWINGS

FIG. 6B is an exploded perspective view of the second free-form curved mirror and the upper side pedestal component seeing from a front surface side of the second free-form curved mirror;

FIG. 12B is an exploded perspective view of the first free-form curved mirror and the mirror holder seeing from a front surface side of the first free-form curved mirror;

DESCRIPTION OF THE PREFERRED EMBODIMENT

An embodiment of the present invention will now be described in accordance with the attached drawings. In the following description, a local Cartesian coordinate system is defined for each optical element. More specifically, an X direction is substantially perpendicular to an optical surface of the optical element (a reflection surface for a mirror and a lens surface for a lens), a Y direction is perpendicular (upward in a vertical direction) to the X direction, and a Z direction is perpendicular to both the X and Y directions (i.e. a horizontal direction). Where necessary, the surface of the mirror formed with the optical surface will be referred to as a front surface, and the other surface of the mirror will be referred to as a back surface.

Figure 1:
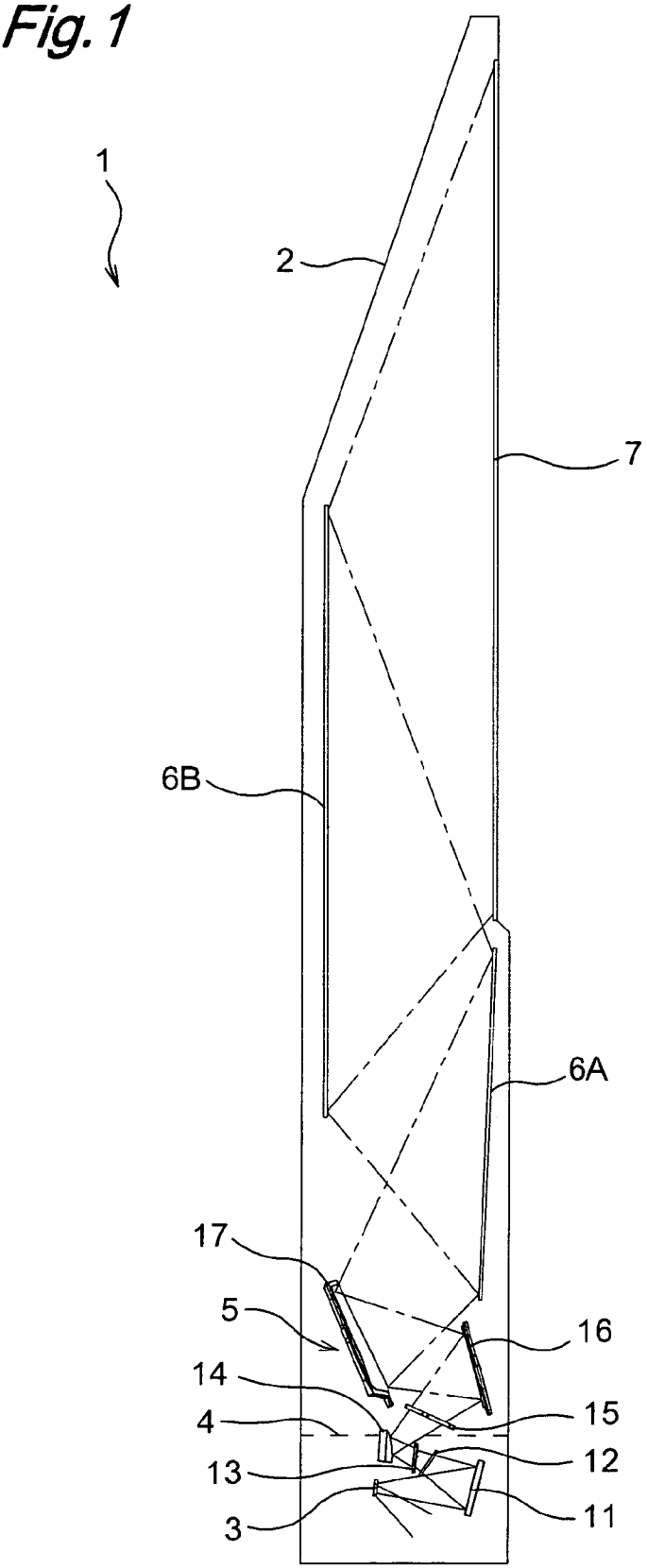
FIG. 1 is a schematic sectional view of a rear projection television comprising holding structures for free-form curved mirrors according to an embodiment of the present invention.

FIG. 1 shows a rear projection television (RPTV) 1 as an example of a projection type image display apparatus comprising a holding structure for a free-form curved mirror according to an embodiment of the present invention. Accommodated in a casing 2 of the RPTV are a digital micromirror device (DMD) 3 as an example of a reflection type image formation device, an illumination unit 4 for irradiating illumination light onto the DMD 3, and a projection unit 5 for enlarging and projecting an image light modulated by the DMD 3. Further, arranged at an upper side of a front surface of the casing 2 is a screen 7 onto which an image enlarged by the projection unit 5 is projected via two plane mirrors 6A, 6B.

Figure 2:
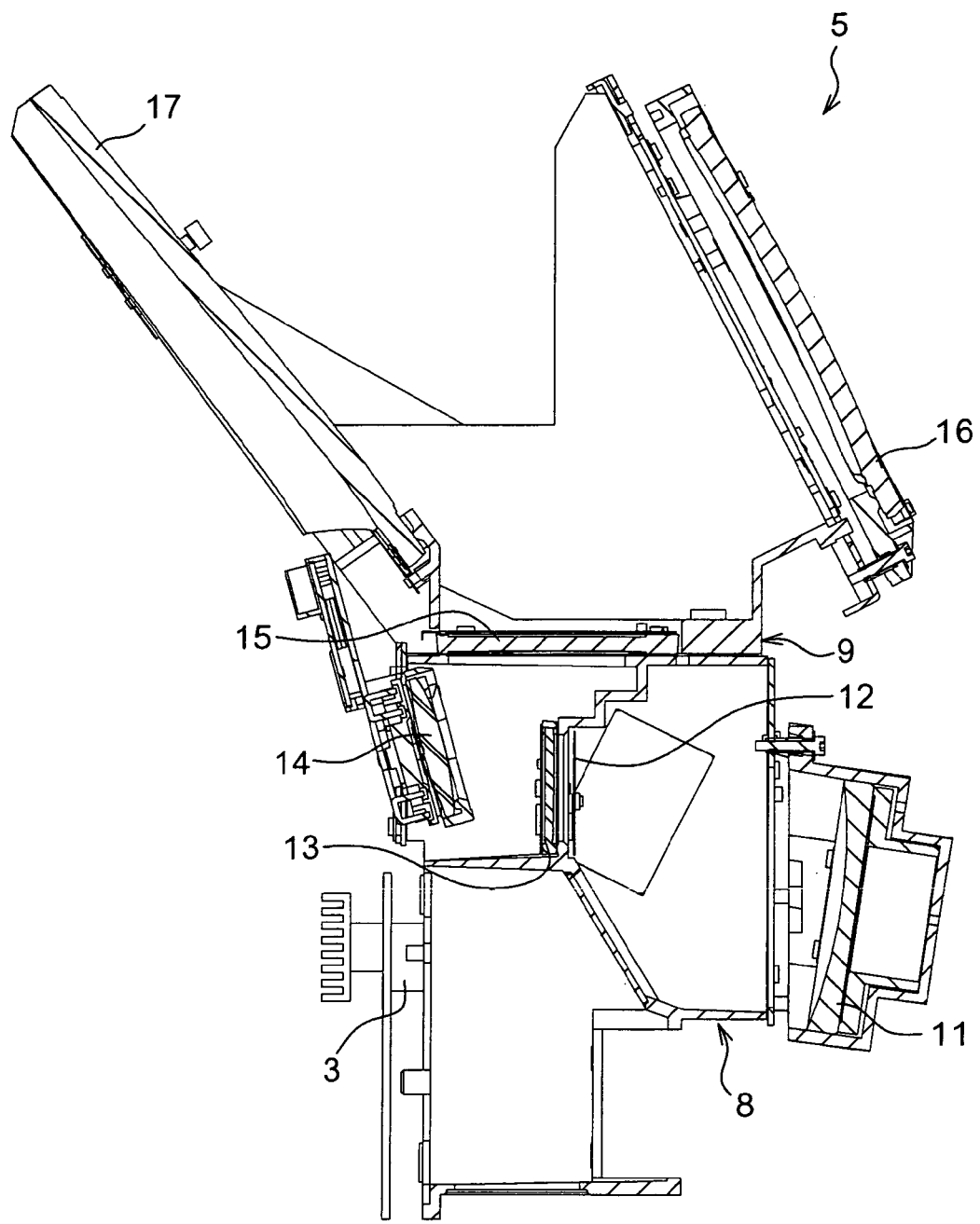
FIG. 2 is a longitudinal sectional view of a projection unit.
Figure 3A:
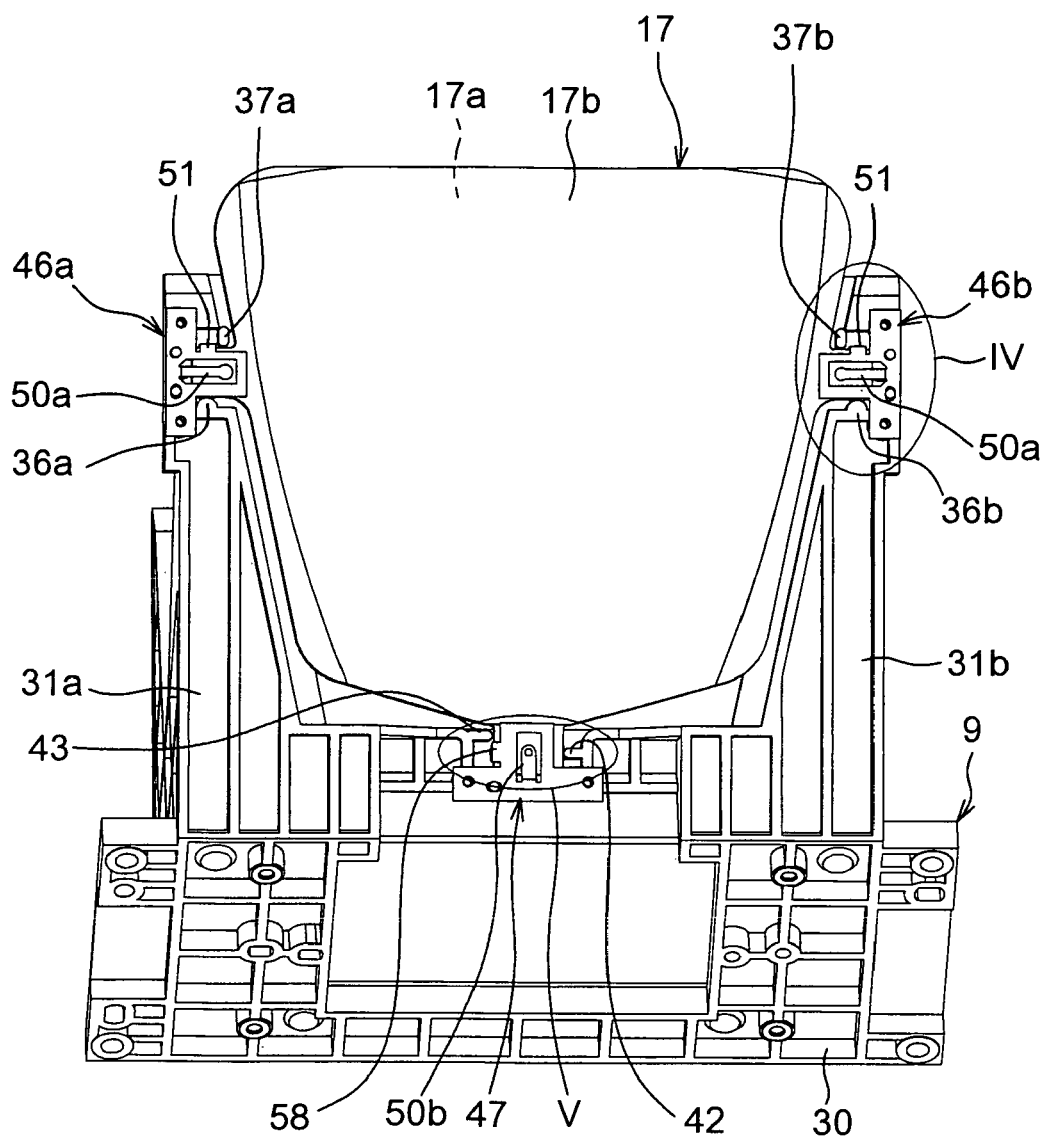
FIG. 3A is a front view of a second free-form curved mirror and an upper side pedestal component in a state where side holding fittings and a lower holding fitting are attached.
Figure 3B:
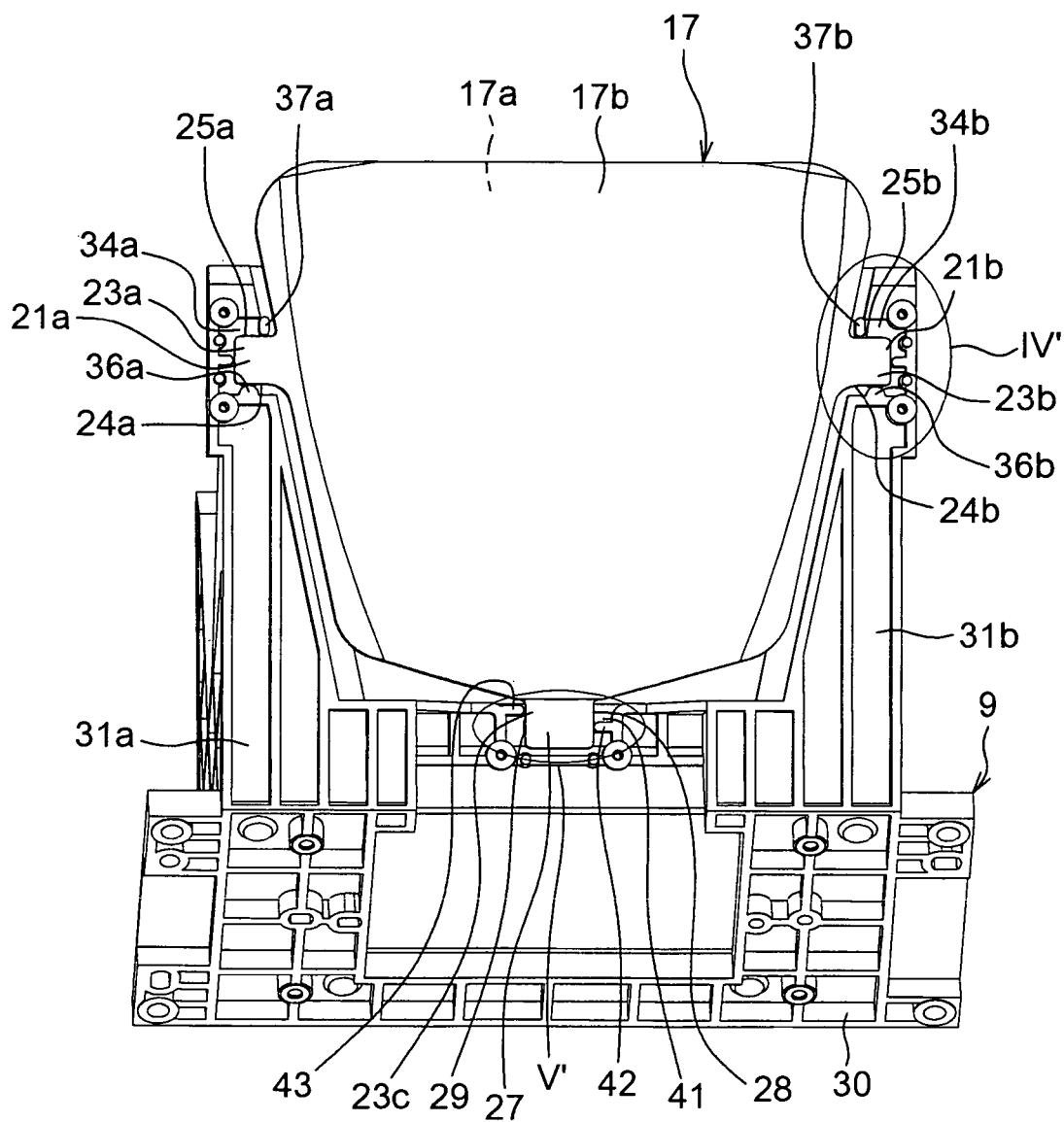
FIG. 3B is a front view showing the second free-form curved mirror and the upper side pedestal component in a state where the side holding fittings and the lower holding fitting are detached.
Figure 4A:
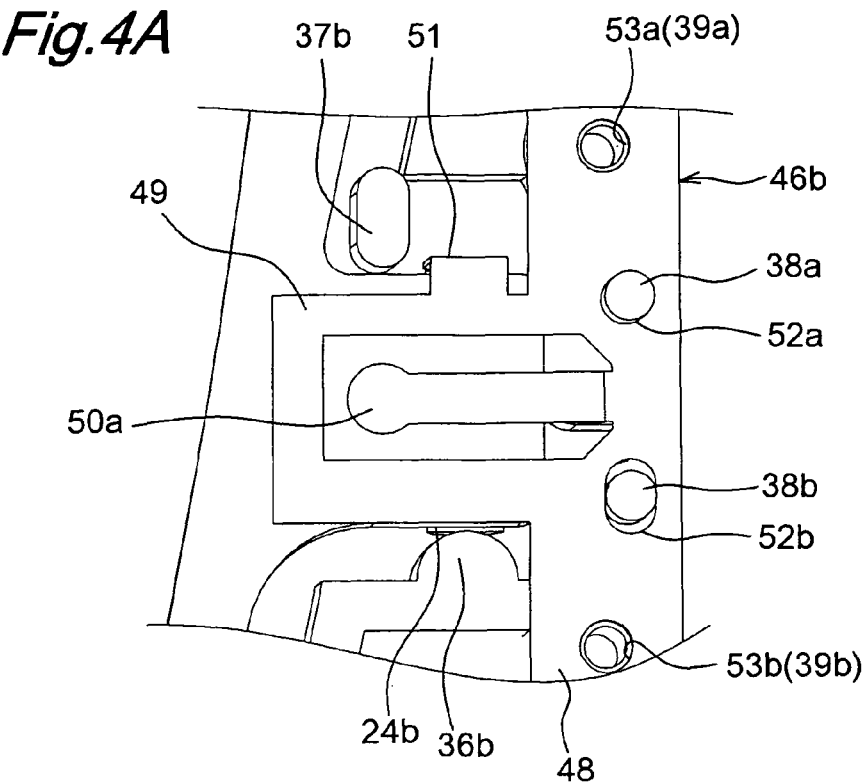
FIG. 4A is an enlarged view of a portion IV in FIG. 3A.
Figure 4B:
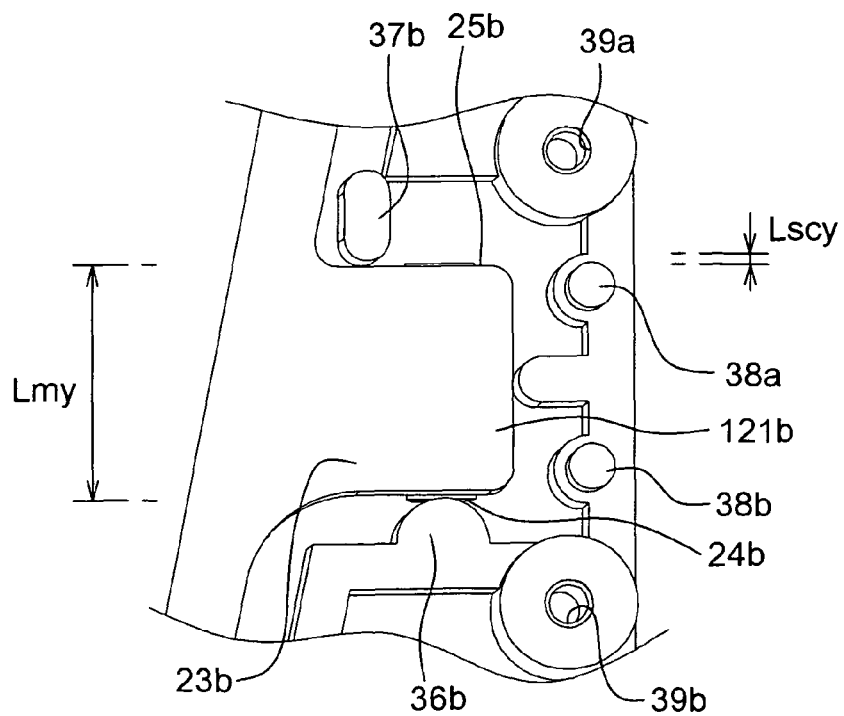
FIG. 4B is an enlarged view of a portion IV' in FIG. 3B.
Figure 5A:
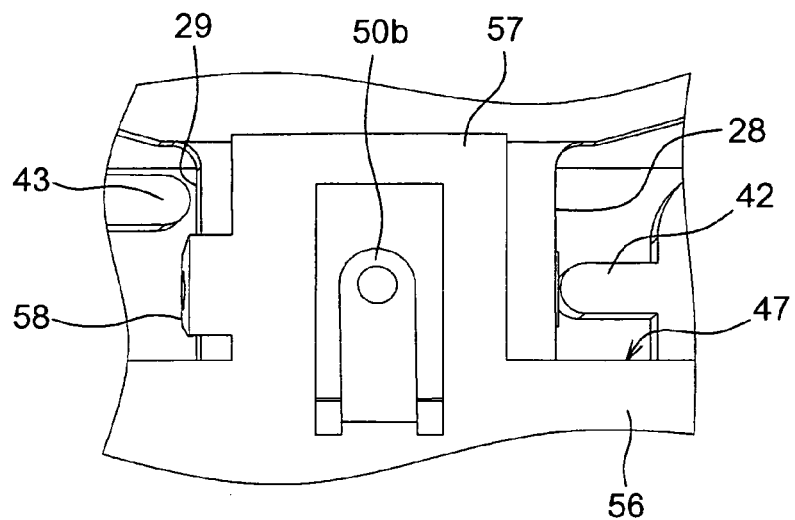
FIG. 5A is an enlarged view of a portion V in FIG. 3A.
Figure 5B:
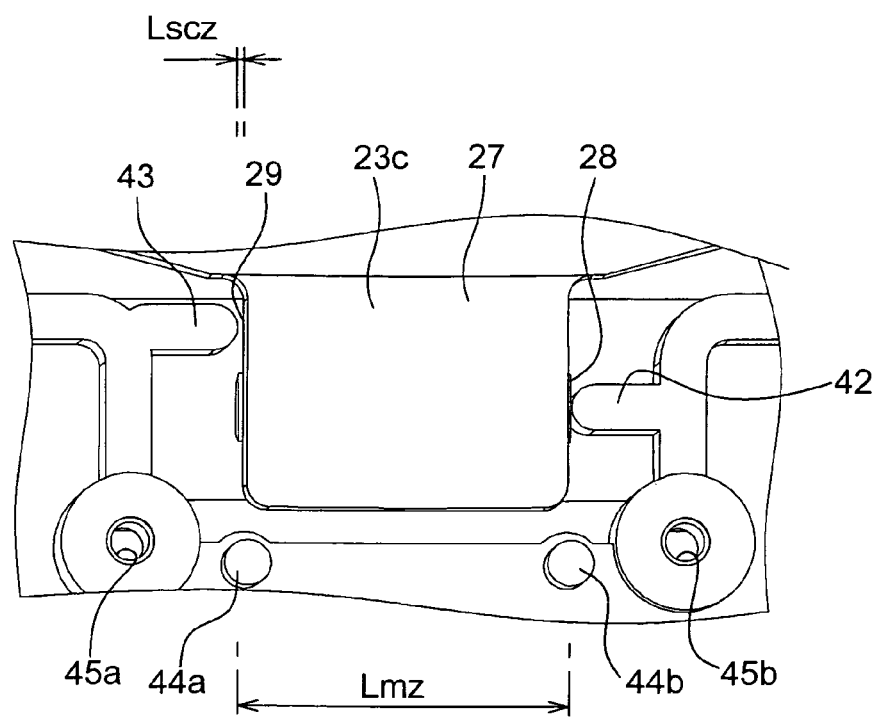
FIG. 5B is an enlarged view of a portion V' in FIG. 3B.
Figure 6A:
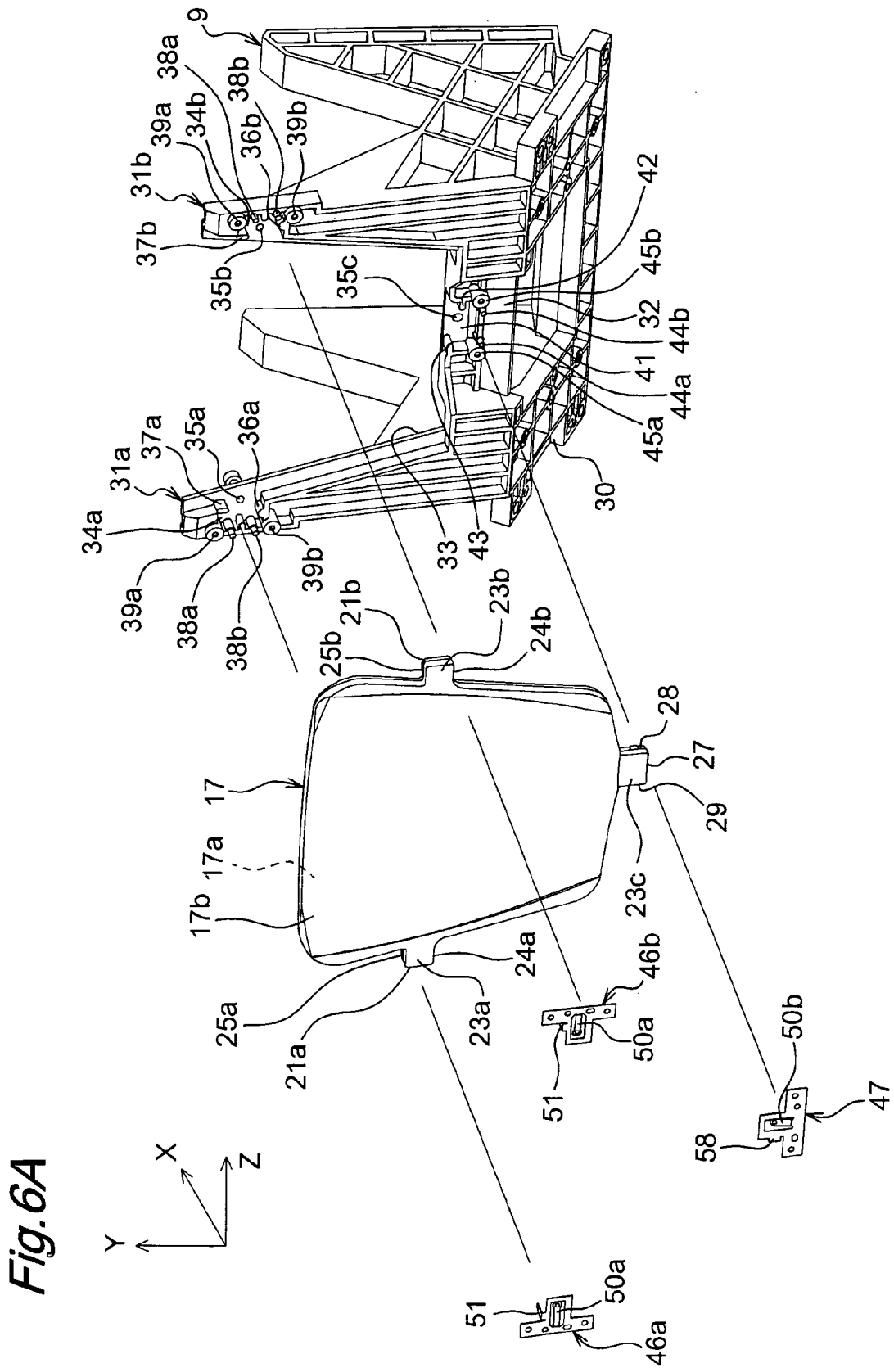
FIG. 6A is an exploded perspective view of the second free-form curved mirror and the upper side pedestal component seeing from a back surface side of the second free-form curved mirror.

Referring to FIG. 2, the projection unit 5 has a lower side pedestal component 8 and an upper side pedestal component 9 for holding various optical elements and the DMD 3. The upper side pedestal component 9 is mounted on the lower side pedestal component 8. The projection unit 5 comprises a concave mirror 11, variable stop mechanism 12, first aberration correction plate 13, convex mirror 14, second aberration correction plate 15, first free-form curved mirror 16, and second free-form curved mirror 17 arranged in series from the DMD 3 side. The image light modulated by the DMD 3 is led to the screen 7 in this order. In this embodiment, the first free-form curved mirror 16 is a concave mirror, and the second free-form curved mirror 17 is a convex mirror. The DMD 3, concave mirror 11, variable stop mechanism 12, first aberration correction plate 13, convex mirror 14, and second aberration correction plate 15 are attached to the lower side pedestal component 8, while the first and second free-form curved mirrors 16, 17 are attached to the upper side pedestal component 9. The present invention is applied to holding structures for the first and second free-form curved mirrors 16, 17.

The holding structure for the second free-form curved mirror 17 will now be described with reference to FIGS. 3A to 8B. The second free-form curved mirror 17 is held directly on the upper side pedestal component 9 with no interposed members. In other words, the upper side pedestal component 9 functions as a holder or holding component for the second free-form curved mirror 17.

Referring to FIGS. 3A, 3B, 6A and 6B, the second free-form curved mirror 17 is formed by injection molding of a thermoplastic resin, and a substantially pentagonal effective area is defined by a convex free-form surface on a front surface 17a thereof. An outer contour of the second free-form curved mirror 17 around the outer periphery of the effective area is also substantially pentagonal. A back surface 17b of the second free-form curved mirror is concave.

Rectangular side tab sections 21a, 21b protrude in the Z direction (horizontal direction) from left and right side peripheral edges of the second free-form curved mirror 17, respectively. Front surfaces of the side tab sections 21a, 21b constitute X direction attachment reference surfaces 22a, 22b, and back surfaces constitute X direction pushed surfaces 23a, 23b. As will be described later, the X direction pushed surfaces 23a, 23b also function as X direction restricted surfaces. Further, lower side end surfaces of the side tab sections 21a, 21b constitute Y direction attachment reference surfaces 24a, 24b, and upper side end surfaces of the side tab sections 21a, 21b constitute Y direction pushed surfaces 25a, 25b. As will be described later, the Y direction pushed surfaces 25a, 25b also function as Y direction restricted surfaces.

A rectangular lower tab section 27 protrudes in the Y direction (downward in the vertical direction) from a lower end side peripheral edge of the second free-form curved mirror 17. A front surface of the lower tab section 27 constitutes an X direction attachment reference surface 22c, and a back surface of the lower tab section 27 constitutes an X direction pushed surface 23c. As will be described later, the X direction pushed surface 23c also functions as an X direction restricted surface. Further, one of the left and right end surfaces of the lower tab section 27 (the right side end surface when seen from the back surface side) constitutes a Z direction attachment reference surface 28, and the other end surface (the left side end surface when seen from the back surface side) constitutes a Z direction pushed surface 29. As will be described later, the Z direction pushed surface 29 also functions as a Z direction restricted surface.

The upper side pedestal component 9 provided with left and right arm sections 31a, 31b extending diagonally rearward from both ends of a base portion 30, and a connecting section 32 connecting lower end sides of the arm sections 31a, 31b. An upper open region surrounded by the arm sections 31a, 31b and the connecting section 32 constitutes a window 33. In the second free-form curved mirror 17, the first and second side tab sections 21a, 21b are supported by back surface sides of the arm sections 31a, 31b, and the lower tab section 27 is supported by a back surface side of the connecting section 32. The front surface 17a of the second free-form curved mirror 17 is opposed to the first free-form curved mirror 16 through the window 33 (Also refer to FIG. 2).

Side receiving concaves 34a, 34b for receiving the side tab sections 21a, 21b are formed on the upper back surface side of the arm sections 31a, 31b. Side walls on the window 33 side of the side receiving concaves 34a, 34b are open so that the side tab sections 21a, 21b can be inserted. X direction positioning sections 35a, 35b with which the X direction attachment reference surfaces 22a, 22b of the side tab sections 21a, 21b come into contact are provided on a bottom wall of the side receiving concaves 34a, 34b. Further, Y direction positioning sections 36a, 36b with which the Y direction attachment reference surfaces 24a, 24b of the side tab sections 21a, 21b come into contact are provided on a lower side wall of the side receiving concaves 34a, 34b. Further, Y direction displacement restricting sections 37a, 37b opposed to the Y direction pushed surfaces 25a, 25b of the side tab sections 21a, 21b are provided on an upper side wall of the side receiving concaves 34a, 34b. A pair of bosses 38a, 38b and a pair of screw holes 39a, 39b for fixing side holding fittings 46a, 46b as described latter are provided alongside of the side receiving concaves 34a, 34b.

In this embodiment, the X direction positioning sections 35a, 35b are hemispherical protrusions protruding to the back surface sides so as to be in point contact with the X direction attachment reference surfaces 22a, 22b of the side tab sections 21a, 21b. Further, the Y direction positioning sections 36a, 36b are semicircular column-shaped protrusions protruding in the Y direction (upward in the vertical direction) and extending in the X direction so as to be in line contact with the Y direction attachment reference surfaces 24a, 24b of the side tab sections 21a, 21b. Further, the Y direction displacement restricting sections 37a, 37b are semicircular column-shaped protrusions protruding in the Y direction (downward in the vertical direction) and extending in the X direction for line contact with the Y direction pushed surfaces 25a, 25b of the side tab sections 21a, 21b.

A lower receiving concave 41 for receiving the lower tab section 27 is formed on the back surface side of the connecting section 32. A side wall (upper side wall) on the window 33 side of the lower receiving concave 41 is open so that the lower tab section 27 can be inserted. Provided on a bottom wall of the lower receiving concave 41 is an X direction positioning section 35c with which the X direction attachment reference surface 22c of the lower tab section 27 is in contact. Further, provided on one of left and right side walls (the right side wall when seen from the back surface side) of the lower receiving concave 41 is a Z direction positioning section 42 with which the Z direction attachment reference surface 28 of the lower tab section 27 is in contact. Furthermore, provided on the other of the left and right side walls (the left side wall when seen from the back surface side) of the lower receiving concave 41 is a Z direction displacement restricting section 43 opposed to the Z direction pushed surface 29 of the lower tab section 27. A pair of bosses 44a, 44b and a pair of screw holes 45a, 45b for fixing a lower holding fitting 47 as described later are provided below the lower receiving concave 41.

In this embodiment, the X direction positioning section 35c is a semispherical protrusion protruding to the back surface side so as to be in point contact with the X direction attachment reference surface 22c of the lower tab section 27. Further, the Z direction positioning section 42 is a protrusion with a semicircular column-shaped tip end protruding in the Z direction (leftward when seen from the back surface side) and extending in the X direction so as to be in line contact with the Z direction attachment reference surface 28 of the lower tab section 27. Further, the Z direction displacement restricting section 43 is a protrusion with a semicircular column-shaped tip end protruding in the Z direction (rightward when seen from the back surface side) and extending in the X direction for contact with the Z direction pushed surface 29 of the lower tab section 27.

The side holding fittings 46a, 46b for holding the side tab sections 21a, 21b received in the side receiving concaves 34a, 34b are fixed to the arm sections 31a, 31b, and the lower holding fitting 47 for holding the lower tab section 27 received in the lower holding concave portion 41 is fixed to the connecting section 32.

Figure 7A:
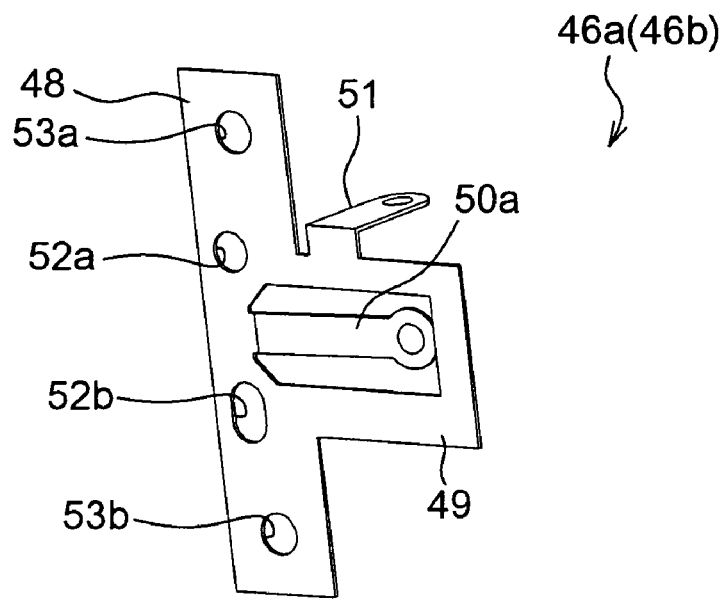
FIG. 7A is a perspective view of the side holding fitting seeing from a back surface side thereof.
Figure 7B:
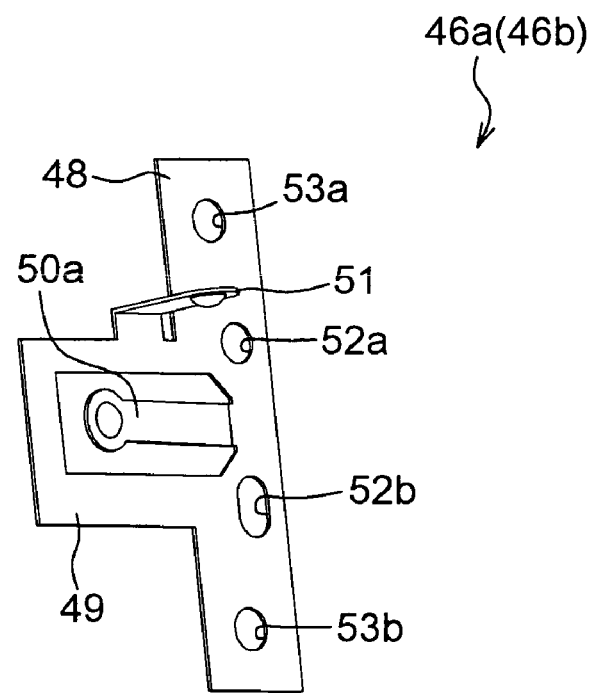
FIG. 7B is a perspective view of the side holding fitting seeing from a front surface side thereof.

Referring to FIGS. 7A and 7B, the side holding fitting 46a is made of a metal having excellent elasticity, and is formed in a laterally-facing T shape constituted by an elongated first base portion 48 extending in the Y direction and a second base portion 49 extending in the Z direction from one lengthwise direction side of the first base portion 48. An X direction pressure spring piece (X direction elastic biasing section) 50a extending along the second base portion 49 from the first base portion 48 is provided in the second base portion 49 by forming a slit therein. A Y direction pressure spring piece (Y direction elastic biasing section) 51 extending perpendicular to the surface of the second base portion 49 (in the X direction) is provided on an upper end side of the second base portion 49. The first base portion 48 is provided with a pair of boss holes 52a, 52b and a pair of through holes 53a, 53b. The side holding fitting 46b is formed in mirror symmetry with the side holding fitting 46a. As will be described latter, the second base portions 49 of the side holding fittings 46a, 46b also function as X direction displacement restricting sections.

The side holding fittings 46a, 46b are fixed to the arm sections 31a, 31b at the side receiving concaves 34a, 34b by inserting the bosses 38a, 38b into the boss holes 52a, 52b and engaging screws (not shown) penetrating the through holes 53a, 53b into the screw holes 39a, 39b.

Figure 8A:
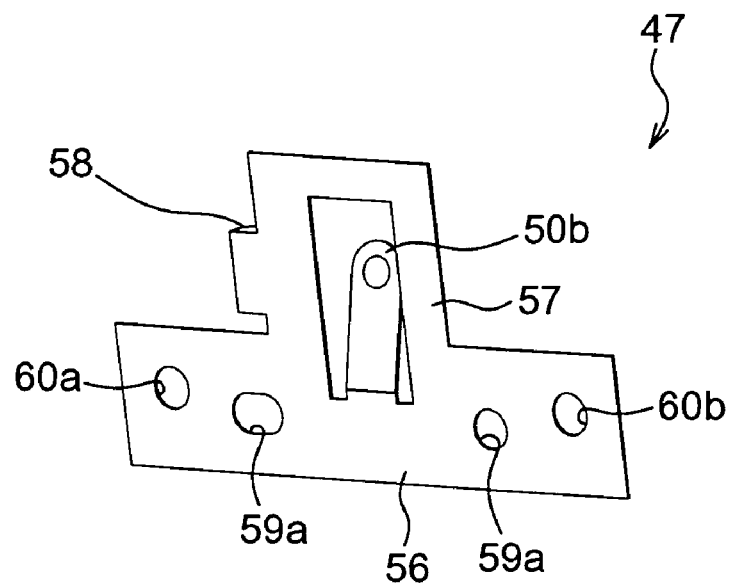
FIG. 8A is a perspective view of the lower holding fitting seeing from a back surface side thereof.
Figure 8B:
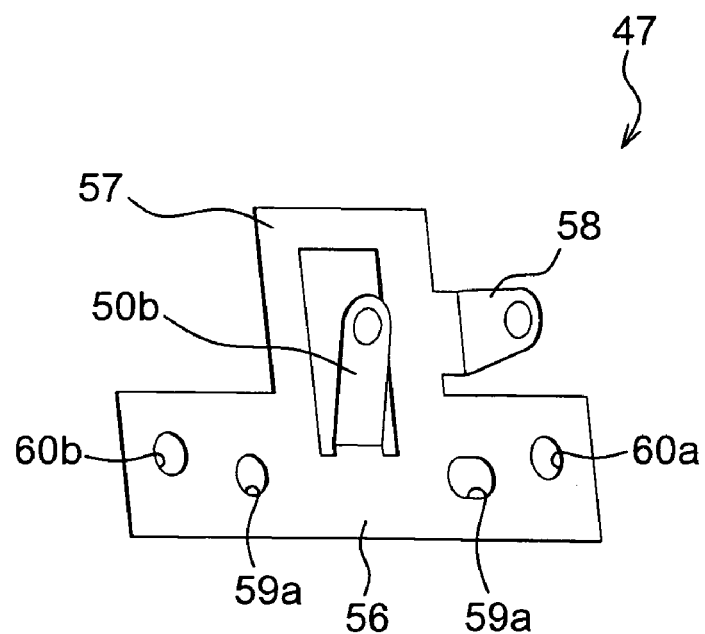
FIG. 8B is a perspective view of the lower holding fitting seeing from a front surface side thereof.
Figure 9A:
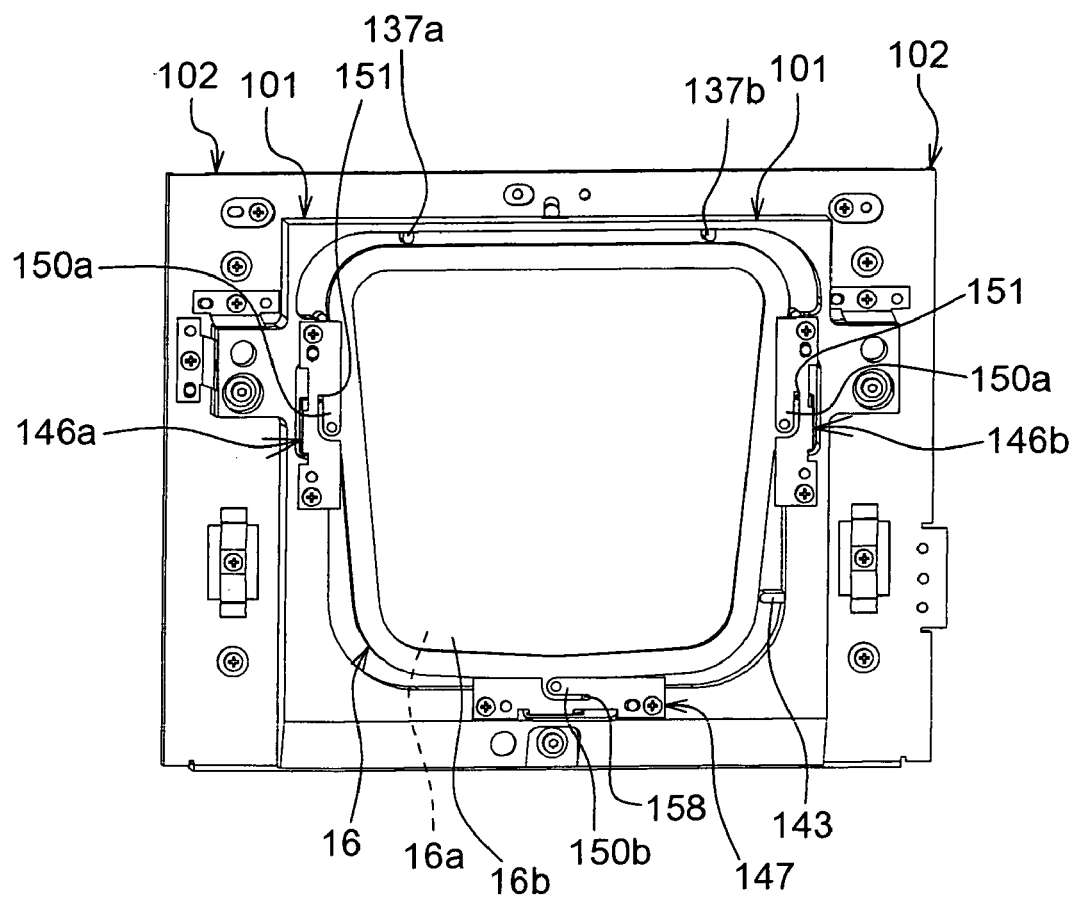
FIG. 9A is a front view of a first free-form curved mirror and a mirror holder in a state where side holding fittings and a lower holding fitting are attached.
Figure 9B:
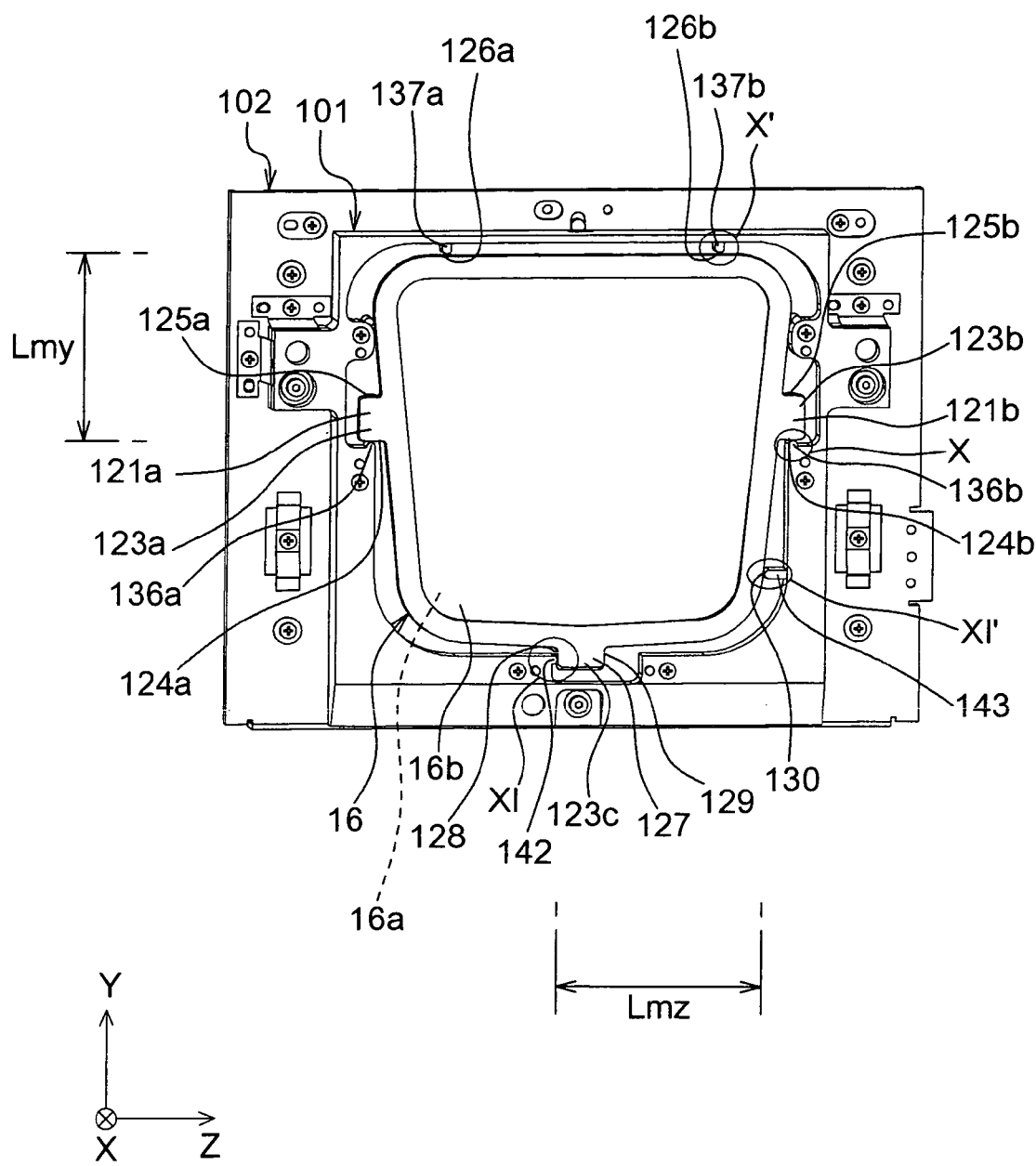
FIG. 9B is a front view of the first free-form curved mirror and the mirror holder in a state where the side holding fittings and the lower holding fitting are detached.

Referring to FIGS. 8A and 8B, the lower holding fitting 47 is made of a metal having excellent elasticity, and is formed in an inverted T shape constituted by an elongated first base portion 56 extending in the Z direction and a second base portion 57 extending in the Y direction from one lengthwise direction side of the first base portion 56. An X direction pressure spring piece (X direction elastic biasing section) 50b extending in the Y direction along the second base portion 57 from the first base portion 56 is provided in the second base portion 57 by forming a slit therein. A Z direction pressure spring piece (Z direction elastic biasing section) 58 extending perpendicular to the surface of the second base portion 57 (in the X direction) is provided on one of the pair of side edges of the second base portion 57 (the left side edge when seen from the back surface side). The first base portion 56 is provided with a pair of boss holes 59a, 59b and a pair of through holes 60a, 60b. As will be described later, the second base portion 57 of the lower holding fitting 47 also functions as an X direction displacement restricting section.

The lower holding fitting 47 is fixed to the connecting section 32 at the lower receiving concave 41 by inserting the bosses 44a, 44b into the boss holes 59a, 59b and engaging screws (not shown) penetrating the through holes 60a, 60b into the screw holes 45a, 45b.

An X direction holding structure for the second free-form curved mirror 17 will now be described. The X direction pressure spring pieces 50a, 50b of the side holding fittings 46a, 46b and lower holding fitting 47 are in contact with the X direction pushed surfaces 23a to 23c of the side tab sections 21a, 21b and lower tab section 27 such that the side tab sections 21a, 21b and lower tab section 27 are elastically biased in the X direction (from the back surface side toward the front surface side) by the X direction pressure spring pieces 50a, 50b. The X direction positioning sections 35a to 35c are disposed opposite to the X direction pressure spring pieces 50a, 50b with respect to with respect to the side tab sections 21a, 21b and lower tab section 27 in the biasing direction (X direction) of the X direction pressure spring pieces 50a, 50b. The X direction attachment reference surfaces 22a to 22c of the side tab sections 21a, 21b and lower tab section 27 biased by the X direction pressure spring pieces 50a, 50b are pressed against the X direction positioning sections 35a to 35c, and thereby the second free-form curved mirror 17 is kept positioned with respect to the upper side pedestal component 9 in the X direction. The second base portions 49, 57 of the side holding fittings 46a, 46b and lower holding fitting 47, which function as X direction displacement restricting sections, are disposed opposite to the X direction positioning sections 35a to 35c with respect to the side tab sections 21a, 21b and lower tab section 27 in the biasing direction (X direction) of the X direction pressure spring pieces 50a, 50b. Further, the second base portions 49, 57 of the side holding fittings 46a, 46b and lower holding fitting 47 are opposed to the X direction pushed surfaces 23a to 23c of the side tab sections 21a, 21b and lower tab section 27 in the biasing direction of the X direction pressure spring pieces 50a, 50b via a gap "Lscx".

Next, a Y direction holding structure for the second free-form curved mirror 17 will be described. Also referring to FIGS. 4A and 4B, the Y direction pressure spring piece 51 of the side holding fittings 46a, 46b is in contact with the Y direction pushed surfaces 25a, 25b of the side tab sections 21a, 21b such that the side tab sections 21a, 21b are elastically biased in the Y direction (downward in the vertical direction) by the Y direction pressure spring piece 51. The Y direction positioning sections 36a, 36b are disposed opposite to the Y direction pressure spring pieces 51 with respect to the side tab sections 21a, 21b in the biasing direction (Y direction) of the Y direction pressure spring pieces 51. The Y direction attachment reference surfaces 24a, 24b of the side tab sections 21a, 21b biased by the Y direction pressure spring pieces 51 are pressed against the Y direction positioning sections 36a, 36b, and thereby the second free-form curved mirror 17 is kept positioned with respect to the upper side pedestal component 9 in the Y direction. The Y direction displacement restricting sections 37a, 37b are disposed opposite to the Y direction positioning sections 36a, 36b with respect to the side tab sections 21a, 21b in the biasing direction of the Y direction pressure spring piece 51 (Y direction). Further, the Y direction displacement restricting sections 37a, 37b is opposed to the Y direction pushed surfaces 25a, 25b of the side tab sections 21a, 21b in the biasing direction of the Y direction pressure spring piece 51 via a gap "Lscy".

Next, a Z direction holding structure for the second free-form curved mirror 17 will be described. Also referring to FIGS. 5A and 5B, the Z direction pressure spring piece 58 of the lower holding fitting 47 is in contact with the Z direction pushed surface 29 of the lower tab section 27 such that the lower tab section 27 is elastically biased in the Z direction (rightward when seen from the back surface side) by the Z direction pressure spring piece 58. The Z direction positioning section 42 is disposed opposite to the Z direction pressure spring piece 58 with respect to the lower tab section 27 in the biasing direction of the Z direction pressure spring piece 58 (Z direction). The Z direction attachment reference surface 28 of the lower tab section 27 biased by the Z direction pressure spring piece 58 is pressed against the Z direction positioning section 42, and thereby the second free-form curved mirror 17 is kept positioned with respect to the upper side pedestal component 9 in the Z direction. The Z direction displacement restricting section 43 is disposed opposite to the Z direction positioning section 42 with respect to the lower tab section 27 in the biasing direction of the Z direction pressure spring piece 58 (Z direction). Further, the Z direction displacement restricting section 43 is opposed to the Z direction pushed surface 29 of the lower tab section 27 in the biasing direction of the Z direction pressure spring piece 58 with a gap "Lscz".

As described above, the second base portions 49, 57 (X direction displacement restricting sections), Y direction displacement restricting sections 37a, 37b, and Z direction displacement restricting section 43 of the side holding fittings 46a, 46b and lower holding fitting 47 are respectively opposed to the X, Y, and Z direction pushed surfaces (restricted surfaces) 23a to 23c, 25a, 25b, and 29 of the side and lower tab sections 21a, 21b, 27 with the gaps "Lscx", "Lscy", and "Lscz". These gaps "Lscx", "Lscy", and "Lscz" are set such that deformations of the X, Y, and Z direction pressure spring pieces 50a, 50b, 51, and 58 remain within an elastic range when the second free-form curved mirror 17 moves against the biasing forces of the X, Y, and Z direction pressure spring pieces 50a, 50b, 51, and 58 such that the X, Y, and Z direction pushed surfaces 23a to 23c, 25a, 25b, and 29 come into contact with the second base portions 49, 57, Y direction displacement restricting sections 37a, 37b, and Z direction displacement restricting section 43. Therefore, even if a large load acts on the second free-form curved mirror 17 in the opposite direction to the biasing directions of the X, Y, and Z direction pressure spring pieces 50a, 50b, 51, and 58 due to an impact caused by falling or the like, displacement of the second free-form curved mirror 17 is limited due to contact with the second base portions 49, 57, Y direction displacement restricting sections 37a, 37b, and Z direction displacement restricting section 43. Further, deformations of the X, Y, and Z direction pressure spring pieces 50a, 50b, 51, and 58 at this time remain within the range of the elastic range and do not enter a plastic range. Accordingly, once the load caused by the impact or the like is ceased, the X, Y, and Z direction pressure spring pieces 50a, 50b, 51, and 58 return to their original shape with no residual distortion, and the side tab sections 21a, 21b and lower tab section 27 of the second free-form curved mirror 17 can be held securely. Therefore, the holding structure for the second free-form curved mirror 17 is capable of holding the second free-form curved mirror 17 with a high degree of reliability, even against a relatively large load acting thereon due the impact caused by falling or the like.

The gaps "Lscx", "Lscy", and "Lscz" are set so as not to restrict an anticipated quantity of thermal expansion of the second free-form curved mirror 17. A distance between the X direction positioning sections 35a to 35c and the second base portions 49, 57, which serve as the X direction displacement restricting sections of the side holding fittings 46a, 46b and lower holding fitting 47, in the biasing direction of the X direction pressure spring pieces 50a, 50b (X direction) is represented by "Lmx". Further, a distance between the Y direction positioning sections 36a, 36b and the Y direction displacement restricting sections 37a, 37b in the biasing direction of the Y direction pressure spring piece 51 (Y direction) is represented by "Lmy" (refer to FIG. 4B). Further, a distance between the Z direction positioning section 42 and the Z direction displacement restricting section 43 in the biasing direction of the Z direction pressure spring piece 58 (Z direction) is represented by "Lmz" (refer to FIG. 5B). A linear expansion coefficient of the material constituting the second free-form curved mirror 17 is represented by "km". Further, a room temperature at which the second free-form curved mirror 17 is typically used ranges approximately between 20 and 25° C., a maximum anticipated temperature during storage and transportation is 80° C., and thus a maximum value of the difference between these two kinds of values is 60K. The condition under which the gap "Lscx" does not restrict an X direction thermal expansion of the side tab sections 21a, 21b and lower tab section 27, the condition under which the gap "Lscy" does not restrict a Y direction thermal expansion of the side tab sections 21a, 21b, and the condition under which the gap "Lscz" does not restrict a Z direction thermal expansion of the lower tab section 27 are expressed in terms of a geometrical relationship by the following Formula (1).

$$(Lmx-Lscx) \times km \times 60 < Lscx$$

$$(Lmy-Lscy) \times km \times 60 < Lscy$$

$$(Lmz-Lscz) \times km \times 60 < Lscz \quad (1)$$

By arranging the Formula (1) for the gaps Lscx, Lscy, Lscz, the relationship of the following Formula (2) is obtained.

$$Lscx > \frac{60 \text{ km} \times Lmx}{1 + 60 \text{ km}} \quad (2)$$

$$Lscy > \frac{60 \text{ km} \times Lmy}{1 + 60 \text{ km}}$$

$$Lscz > \frac{60 \text{ km} \times Lmz}{1 + 60 \text{ km}}$$

Increases in the environmental temperature during storage, transportation or the like may increase the temperature of the second free-form curved mirror 17 to cause thermal expansion thereof. However, the gaps "Lscx", "Lscy", and "Lscz" set so as to satisfy the Formula (2) prevent generation of thermal stresses caused by restricting the thermal expansions between X direction positioning sections 35a to 35c and the second base portions 49, 57 serving as X direction displacement restricting sections, between the Y direction positioning sections 36a, 36b and Y direction displacement restricting sections 37a, 37b, and between the Z direction positioning section 42 and Z direction displacement restricting section 43, resulting in that deformation of the second free-form curved mirror 17 due to the thermal stresses can be avoided. In other words, the gaps "Lscx", "Lscy", and "Lscz" as shown in the Formula (2) can achieve holding of the second free-form curved mirror 17 with a high degree of reliability even in relation to temperature increases.

The side holding fittings 46a, 46b comprise the X and Y direction pressure spring pieces 50a, 51 and the second base portion 49 functioning as the X direction displacement restricting section. Further, the lower holding fitting 47 comprises the X and Z direction pressure spring pieces 50b, 58 and the second base portion 57 functioning as the X direction displacement restricting section. These arrangements where each of the side and lower holding fittings 46a, 46b, and 47 are provided with not only the pressure spring pieces but also the displacement restricting section can reduce the number of components, thereby enabling simplification of the holding structure.

In the X direction, the X direction positioning sections 35a to 35c and the second base portions 49, 57 serving as the X direction displacement restricting sections are disposed on either side of the side tab sections 21a, 21b and lower tab section 27, and therefore the distance "Lmx" between the X direction positioning sections 35a to 35c and X direction displacement restricting sections can be minimized. In the Y direction, the Y direction positioning sections 36a, 36b and the Y direction displacement restricting sections 37a, 37b are disposed on either side of the individual side tab sections 21a, 21b, and therefore the distance "Lmy" between the Y direction positioning sections 36a, 36b and Y direction displacement restricting sections 37a, 37b can be minimized. Similarly, in the Z direction, the Z direction positioning section 42 and the Z direction displacement restricting section 43 are disposed on either side of the single lower tab section 27, and therefore the distance "Lmz" between the Z direction positioning section 42 and the Z direction displacement restricting section 43 can be minimized. Therefore, the gaps "Lscx", "Lscy", and "Lscz" between the second free-form curved mirror 17 (side tab sections 21a, 21b and lower tab section 27) and the X, Y, and Z direction displacement restricting sections 49, 57, 37a, 37b, and 43 can be set with a high degree of precision relative to the distances "Lmx", "Lmy", and "Lmz", resulting in that the gaps "Lscx", "Lscy", and "Lscz" can be minimized within a range satisfying the condition where the thermal expansions are not to be restricted. As a result, the amount of deformation in the X direction pressure spring pieces 50a, 50b, Y direction pressure spring piece 51, and Z direction pressure spring piece 58 when the second free-form curved mirror 17 displaces to come into contact with the X direction displacement restricting sections 49, 57, Y direction displacement restricting sections 37a, 37b, and Z direction displacement restricting section 43 due to the load caused by the impact during the fall or the like can be suppressed to a minimum. In other words, the required deformation amounts of the X direction pressure spring pieces 50a, 50b, Y direction pressure spring piece 51, and Z direction pressure spring piece 58 are small enough to remain sufficient margins before exceeding the elastic range and entering the plastic range. Therefore, even when deformation occurs repeatedly, the X direction pressure spring pieces 50a, 50b, Y direction pressure spring piece 51, and Z direction pressure spring piece 58 are capable of reliably biasing the side tab sections 21a, 21b and lower tab section 27 toward the X direction positioning sections 35a to 35c, Y direction positioning sections 36a, 36b, and Z direction positioning section 42, thereby further improving the reliability in holding of the second free-form curved mirror 17.

Next, referring to FIGS. 9A to 14B, a holding structure for the first free-form curved mirror 16 will be described. The first free-form curved mirror 16 is held in a mirror holder 101. The mirror holder 101 is attached to a mirror holder base 102 so that the position thereof can be adjusted, and the mirror holder base 102 is fixed to the upper side pedestal component 9.

Referring to FIGS. 9A, 9B, 12A and 12B, the first free-form curved mirror 16 is formed by injection-molding of a thermoplastic resin, and a substantially trapezoid effective area is formed by a convex free-form surface on a front surface 16a thereof. An outer contour of the first free-form curved mirror 16 around the outer periphery of the effective area is also substantially trapezoid. A back surface 16b of the first free-form curved mirror 16 is convex.

Rectangular side tab sections 121a, 121b protrude in the Z direction (horizontal direction) from left and right side edges of the first free-form curved mirror 16, respectively. Front surfaces of the side tab sections 121a, 121b constitute X direction attachment reference surfaces 122a, 122b, and back surfaces constitute X direction pushed surfaces 123a, 123b. As will be described later, the X direction pushed surfaces 123a, 123b also function as X direction restricted surfaces. Further, lower side end surfaces of the side tab sections 121a, 121b constitute Y direction attachment reference surfaces 124a, 124b, and upper side end surfaces constitute Y direction pushed surfaces 125a, 125b.

A rectangular lower tab section 127 protrudes in the Y direction (vertical direction) from a lower end edge of the first free-form curved mirror 16. A front surface of the lower tab section 27 constitutes an X direction attachment reference surface 122c, and a back surface constitutes an X direction pushed surface 123c. As will be described later, the X direction pushed surface 123c also functions as an X direction restricted surface. Further, one of the left and right end surfaces of the lower tab section 127 (the left side end surface when seen from the back surface side) constitutes a Z direction attachment reference surface 128, and the other end surface (the right side end surface when seen from the back surface side) constitutes a Z direction pushed surface 129.

The mirror holder 101 comprises a rectangular window 103 corresponding to the effective area of the first free-form curved mirror 16, and a window 104 is also provided in the mirror holder base 102. The first free-form curved mirror 16 is opposed to the second free-form curved mirror 17 through these windows 103, 104 (also refer to FIG. 2).

Figure 10A:
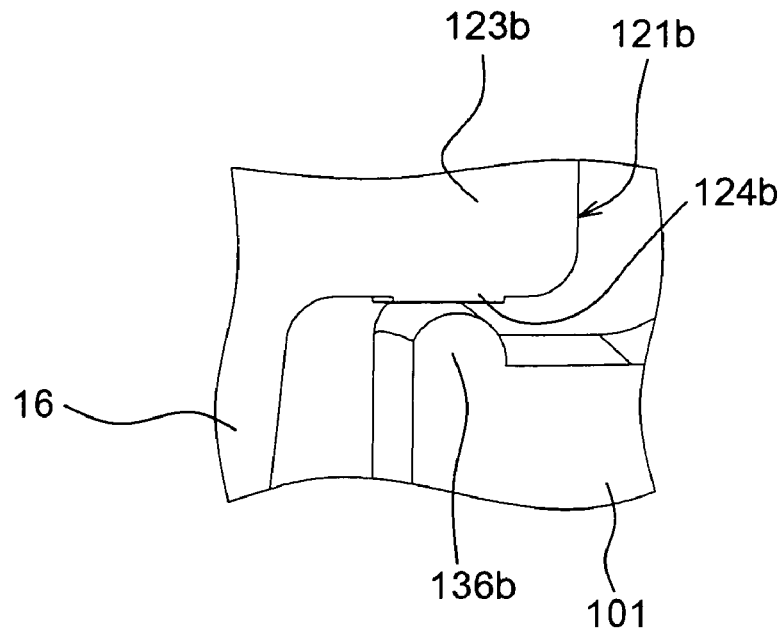
FIG. 10A is an enlarged view of a portion X in FIG. 9B.

Side receiving concaves 134a, 134b for receiving the side tab sections 121a, 121b are formed on an upper back surface side of the mirror holder 101. X direction positioning sections 135a, 135b are provided on a bottom wall of the side receiving concaves 134a, 134b. Further, as shown in FIG. 10A, Y direction positioning sections 136a, 136b are provided on a lower side wall of the side receiving concaves 134a, 134b.

Figure 10B:
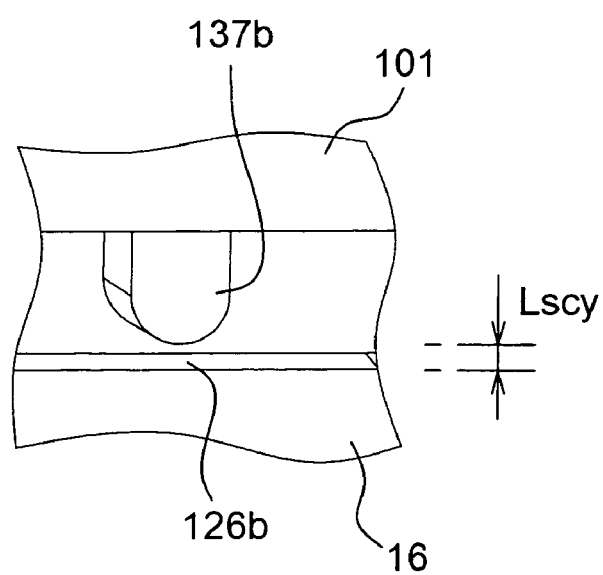
FIG. 10B is an enlarged view of a portion X' in FIG. 9B.

Also referring to FIG. 10B, Y direction displacement restricting sections 137a, 137b are provided at an upper area of the window 103 rather than inside the side receiving concaves 134a, 134b. Parts of the upper side end surface of the first free-form curved mirror 16 opposed to the Y direction displacement restricting sections 137a, 137b function as Y direction restricted surfaces 126a, 126b.

A lower receiving concave 141 for receiving the lower tab section 127 is formed on a lower back surface side of the mirror holder 101. An X direction positioning section 135c is provided on a bottom wall of the lower receiving concave 141. Further, also referring to FIG. 11A, a Z direction positioning section 142 is provided on one of the left and right side walls of the lower receiving concave 141 (the left side wall when seen from the back surface side).

Figure 11A:
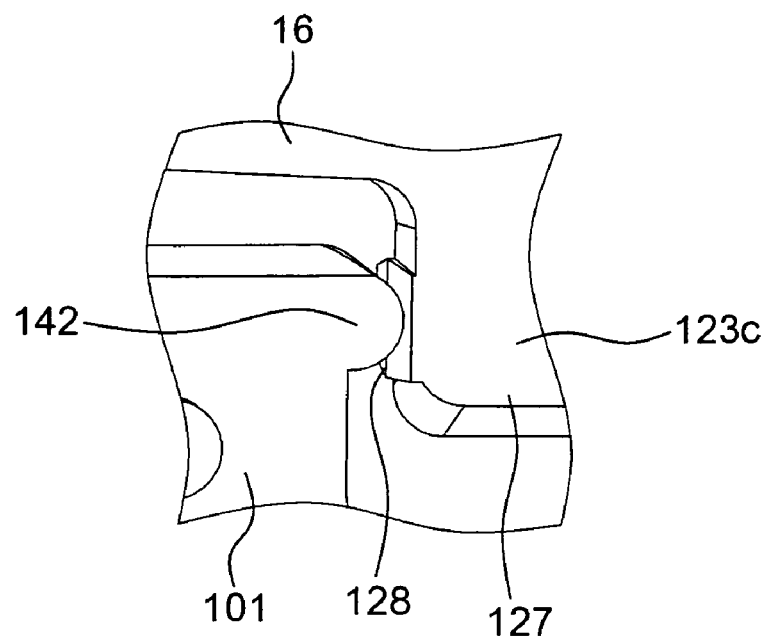
FIG. 11A is an enlarged view of a portion XI in FIG. 9B.
Figure 11B:
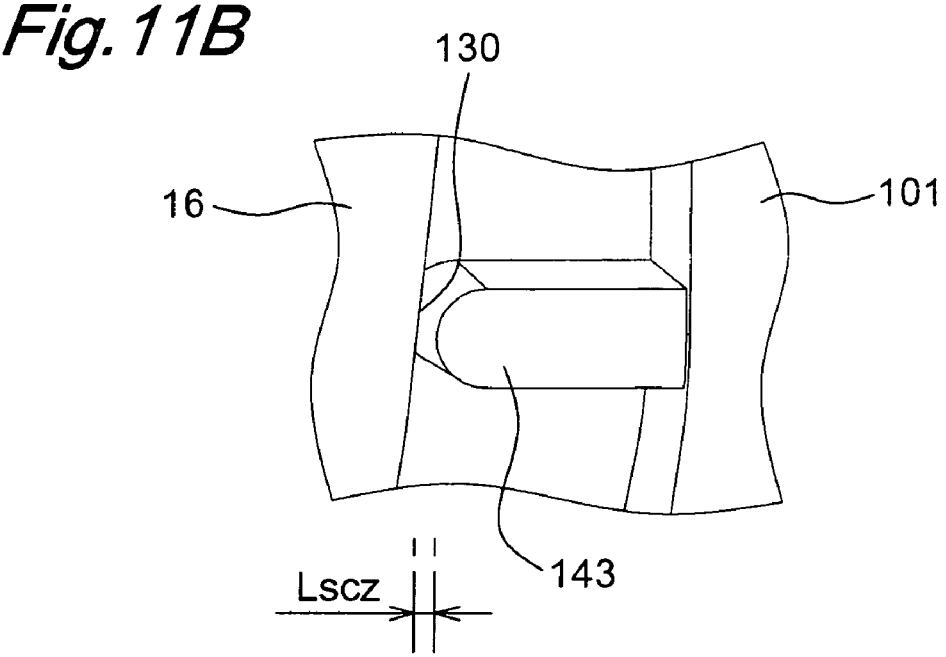
FIG. 11B is an enlarged view of a portion XI' in FIG. 9B.
Figure 12A:
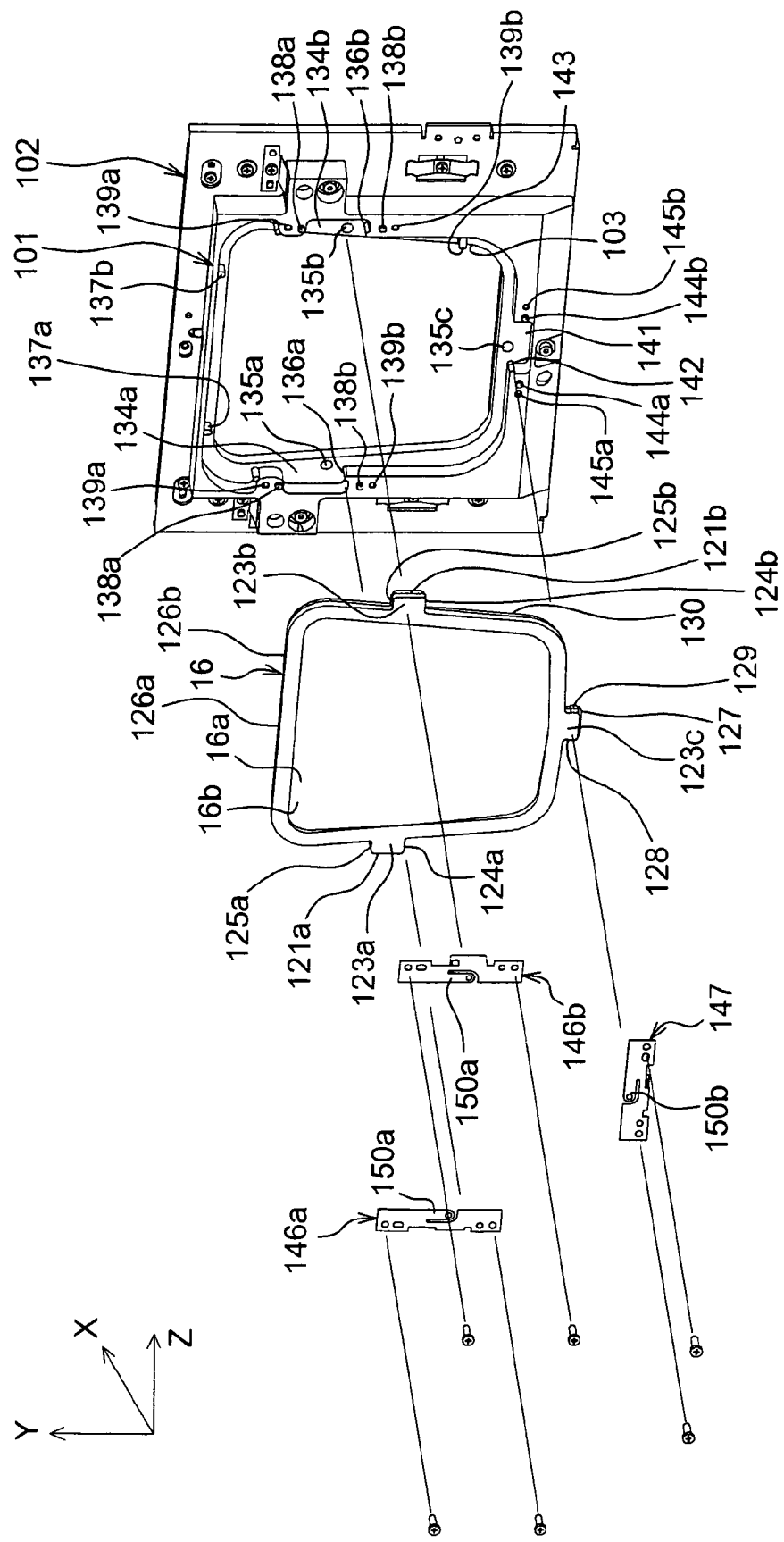
FIG. 12A is an exploded perspective view of the first free-form curved mirror and the mirror holder seeing from a back surface side of the first free-form curved mirror.

As shown in FIG. 11B, a Z direction displacement restricting section 143 is provided on a side area of the window 103 below the side receiving concaves 134a, 134b (the right side when seen from the back surface side) rather than inside the lower receiving concave 141. A part of the side end surface of the first free-form curved mirror 16 opposed to the Z direction displacement restricting section 143 functions as a Z direction restricted surface 130.

Figure 13A:
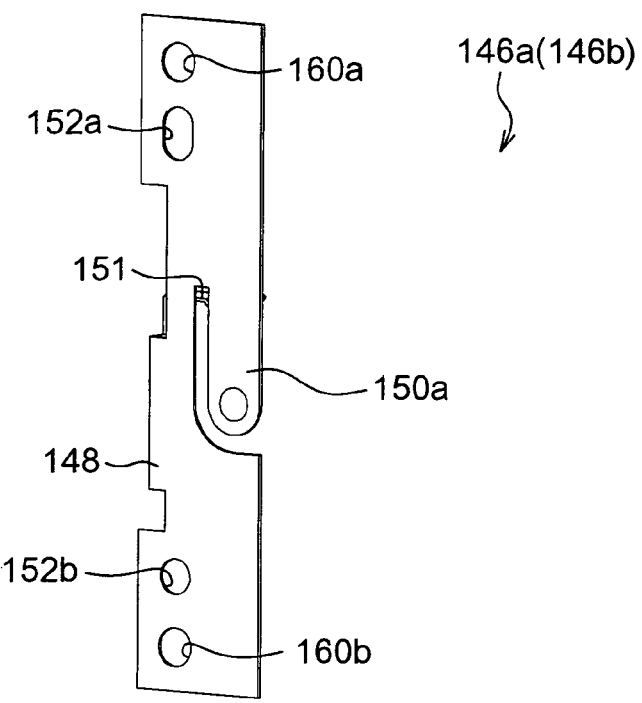
FIG. 13A is a perspective view of the side holding fitting seeing from a back surface side thereof.
Figure 13B:
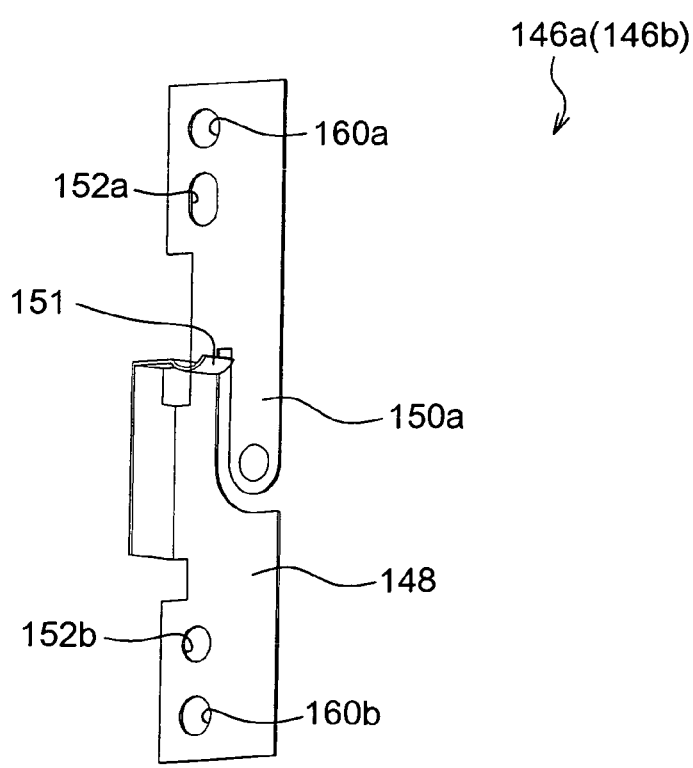
FIG. 13B is a perspective view of the side holding fitting seeing from a front surface side thereof.

Also referring to FIGS. 13A and 13B, a side holding fitting 146a for holding the side tab section 121a received in the side receiving concave 134a is made of a metal having excellent elasticity, and comprises an elongated base portion 148 extending in the Y direction. An X direction pressure spring piece (X direction elastic biasing section) 150a extending along the base portion 148 is provided in the base portion 148 by forming a slit therein. Further, a narrow piece formed by cutting is provided in a side portion of the base portion 148, and a Y direction pressure spring piece (Y direction elastic biasing section) 151 extending perpendicular to the surface of the base portion 148 (in the X direction) is provided at an upper end thereof. The base portion 148 is provided with a pair of boss holes 152a, 152b and a pair of through holes 160a, 160b. A side holding fitting 146b for holding the side tab section 121b received in the side receiving concave 134b is formed in mirror symmetry with the side holding fitting 146a. As will be described later, the base portions 148 of the side holding fittings 146a, 146b also function as X direction displacement restricting sections.

The side holding fittings 146a, 146b are fixed to the mirror holder 101 at the side receiving concaves 134a, 134b by inserting bosses 138a, 138b of the mirror holder 101 into the boss holes 152a, 152b and engaging screws penetrating the through holes 160a, 160b into screw holes 139a, 139b of the mirror holder 101.

Figure 14A:
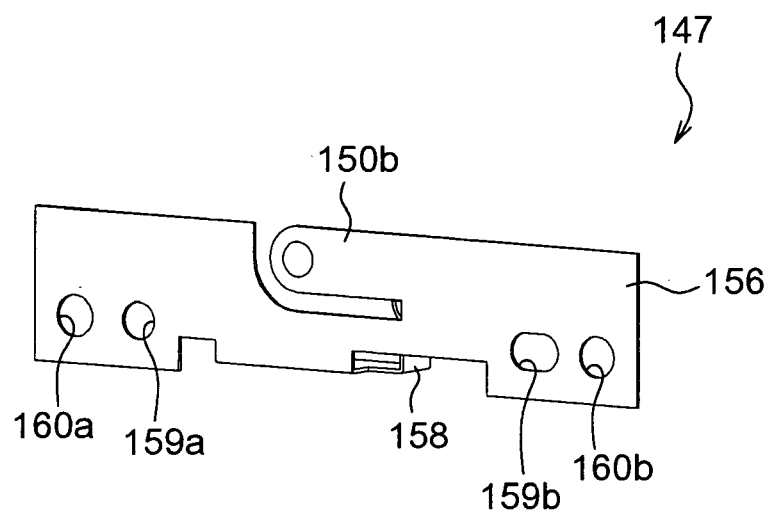
FIG. 14A is a perspective view of the lower holding fitting seeing from a back surface side thereof.
Figure 14B:
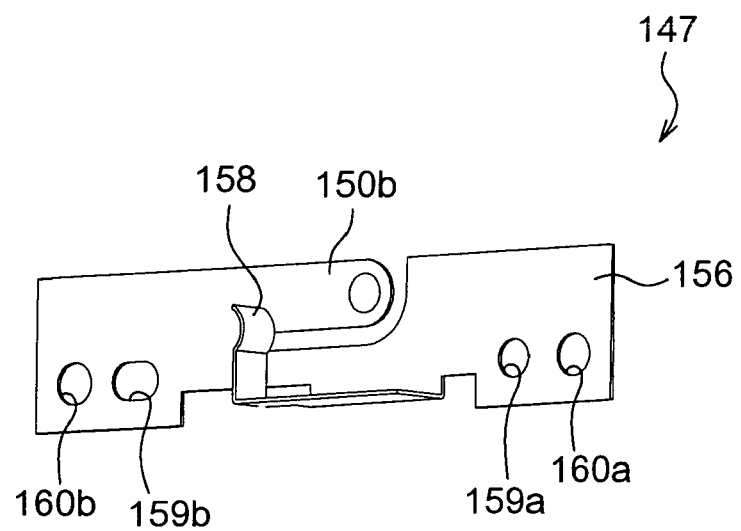
FIG. 14B is a perspective view of the lower holding fitting seeing from a front surface side thereof.

Also referring to FIGS. 14A and 14B, a lower holding fitting 147 for holding the lower tab section 127 received in the lower receiving concave 141 is made of a metal having excellent elasticity, and comprises an elongated base portion 156 extending in the Z direction. An X direction pressure spring piece (X direction elastic biasing section) 150b extending along the base portion 156 is provided in the base portion 156 by forming a slit therein. Further, a narrow piece formed by cutting is provided in the lower portion of the base portion 156, and a Z direction pressure spring piece (Z direction elastic biasing section) 158 extending in the Y direction (upward in the vertical direction) is provided at a tip end thereof. The base portion 156 is provided with a pair of boss holes 159a, 159b and a pair of through holes 160a, 160b. As will be described later, the base portion 156 of the lower holding fitting 147 also functions as an X direction displacement restricting section.

The lower holding fitting 147 is fixed to the mirror holder 101 at the lower receiving concave 141 by inserting bosses 144a, 144b of the mirror holder 101 side into the boss holes 159a, 159b and engaging screws penetrating the through holes 160a, 160b into screw holes 145a, 145b of the mirror holder 101 side.

An X direction holding structure for the first free-form curved mirror 16 will now be described. The X direction pressure spring pieces 150a, 150b of the side holding fittings 146a, 146b and lower holding fitting 147 are in contact with the X direction pushed surfaces 123a to 123c of the side tab sections 121a, 121b and lower tab section 127 such that the side tab sections 121a, 121b and lower tab section 127 are elastically biased in the X direction (from the back surface side toward the front surface side) by the X direction pressure spring pieces 150a, 150b. The X direction positioning sections 135a to 135c are disposed opposite to X direction pressure spring pieces 150a, 150b with respect to the side tab sections 121a, 121b and lower tab section 127 in the biasing direction of the X direction pressure spring pieces 150a, 150b (X direction). The X direction attachment reference surfaces 122a to 122c of the side tab sections 121a, 121b and lower tab section 127 biased by the X direction pressure spring pieces 150a, 150b are pressed against the X direction positioning sections 135a to 135c, and thereby the first free-form curved mirror 16 is kept positioned with respect to the mirror holder 101 in the X direction. The base portions 148, 156 of the side holding fittings 146a, 146b and lower holding fitting 147, which function as X direction displacement restricting sections, are disposed opposite to the X direction positioning sections 135a to 135c with respect to the side tab sections 121a, 121b and lower tab section 127 in the biasing direction of the X direction pressure spring pieces 150a, 150b (X direction). Further, the base portions 148, 156 of the side holding fittings 146a, 146b and lower holding fitting 147 are opposed to the X direction pushed surfaces 123a to 123c of the side tab sections 121a, 121b and lower tab section 127 in the biasing direction of the X direction pressure spring pieces 150a, 150b with a gap "Lscx".

Next, a Y direction holding structure for the first free-form curved mirror 16 will be described. Also referring to FIGS. 10A and 10B, the Y direction pressure spring pieces 151 of the side holding fittings 146a, 146b are in contact with the Y direction pushed surfaces 125a, 125b of the side tab sections 121a, 121b such that the side tab sections 121a, 121b are elastically biased in the Y direction (downward in the vertical direction) by the Y direction pressure spring pieces 151. The Y direction positioning sections 136a, 136b are disposed opposite to the Y direction pressure spring pieces 151 with respect to the side tab sections 121a, 121b in the biasing direction of the Y direction pressure spring piece 151 (Y direction). The Y direction attachment reference surfaces 124a, 124b of the side tab sections 121a, 121b biased by the Y direction pressure spring piece 151 are pressed against the Y direction positioning sections 136a, 136b, and thereby the first free-form curved mirror 16 is kept positioned with respect to the mirror holder 101 in the Y direction. The Y direction displacement restricting sections 137a, 137b are disposed opposite to the Y direction positioning sections 136a, 136b with respect to the side tab sections 121a, 121b in the biasing direction of the Y direction pressure spring piece 151 (Y direction). Further, the Y direction displacement restricting sections 137a, 137b is opposed to the Y direction restricted surfaces 126a, 126b in the biasing direction of the Y direction pressure spring piece 151 with a gap "Lscy".

Next, a Z direction holding structure for the first free-form curved mirror 16 will be described. Referring to FIGS. 11A and 11B, the Z direction pressure spring piece 158 of the lower holding fitting 147 is in contact with the Z direction pushed surface 129 of the lower tab section 127 such that the lower tab section 127 is elastically biased in the Z direction (leftward when seen from the back surface side) by the Z direction pressure spring piece 158. The Z direction positioning section 142 is disposed opposite to the Z direction pressure spring piece 158 with respect to the lower tab section 127 in the biasing direction of the Z direction pressure spring piece 158 (Z direction). The Z direction attachment reference surface 128 of the lower tab section 127 biased by the Z direction pressure spring piece 158 is pressed against the Z direction positioning section 142, and thereby the first free-form curved mirror 16 is kept positioned with respect to the mirror holder 101 in the Z direction. The Z direction displacement restricting section 143 is disposed opposite to the Z direction positioning section 142 with respect to the lower tab section 127 in the biasing direction of the Z direction pressure spring piece 158 (Z direction). Further, the Z direction displacement restricting section 143 is opposed to the Z direction restricted surface 130 in the biasing direction of the Z direction pressure spring piece 158 with a gap "Lscz2.

The gaps "Lscx", "Lscy", and "Lscz" are set such that deformations of the X, Y, and Z direction pressure spring pieces 150a, 150b, 151, and 158 remain within the elastic range when the first free-form curved mirror 16 moves against the biasing forces of the X, Y, and Z direction pressure spring pieces 150a, 150b, 151, and 158 such that the X, Y, and Z direction pushed surfaces 123a to 123c, 125a, 125b, and 129 come into contact with the base portions 148, 156, Y direction displacement restricting sections 137a, 137b, and Z direction displacement restricting section 143. Therefore, even if a large load acts on the first free-form curved mirror 16 in the opposite direction to the biasing directions of the X, Y, and Z direction pressure spring pieces 150a, 150b, 151, and 158 due to an impact caused by falling or the like, deformations of the X, Y, and Z direction pressure spring pieces 150a, 150b, 151, and 158 remain within the range of the elastic range and no not enter the plastic range. Therefore, the holding structure for the first free-form curved mirror 16 is capable of holding the first free-form curved mirror 16 with a high degree of reliability, even if a relatively large load acts thereon due to the impact caused by falling or the like.

The gaps "Lscx", "Lscy", and "Lscz" are set so as not to restrict an anticipated quantity of thermal expansion of the first free-form curved mirror 16. Specifically, the gaps "Lscx", "Lscy", and "Lscz" are set to satisfy the conditions of the Formulas (1) and (2) described above in relation to the holding structure for the second free-form curved mirror 17. The gaps "Lscx", "Lscy", and "Lscz" as set above can avoid restrictions of thermal expansions of first free-form curved mirror 16 between the X direction positioning sections 135a to 135c and the base portions 148, 156 serving as the X direction displacement restricting sections, between the Y direction positioning sections 136a, 136b and Y direction displacement restricting sections 137a, and between the Z direction positioning section 142 and Z direction displacement restricting section 143, resulting in that deformation of the first free-form curved mirror 16 due to the thermal expansions can be prevented.

The side holding fittings 146a, 146b comprise the X direction pressure spring piece 150a and the Y direction pressure spring piece 151 and the base portion 148 functioning as an X direction displacement restricting section. Further, the lower holding fitting 147 comprises the X direction pressure spring piece 150b and the Z direction pressure spring piece 158 and the base portion 156 functioning as an X direction displacement restricting section. These arrangements where each of the side and lower holding fittings 146a, 146b are provided with not only the pressure spring pieces but also the displacement restricting section can reduce the number of components, thereby enabling simplification of the holding structure.

In the X direction, the X direction positioning sections 135a to 135c and the base portions 148, 156 serving as X direction displacement restricting sections are disposed on either side of the side tab sections 121a, 121b and lower tab section 127, and therefore the distance "Lmx" between the X direction positioning sections 135a to 135c and the X direction displacement restricting sections can be minimized. Therefore, the gap "Lscx" between the side tab sections 121a, 121b of the first free-form curved mirror 16 and the base portions 148, 156 serving as X direction displacement restricting sections can be set with a high degree of precision relative to the distance "Lmx", resulting in that the gap "Lscx" can be minimized within a range satisfying the condition where the thermal expansion is not to be restricted. As a result, the amount of deformation in the X direction pressure spring pieces 150a, 150b can be suppressed to a minimum. This assures that and even when deformation occurs repeatedly, the X direction pressure spring pieces 150a, 150b are capable of reliably biasing the side tab sections 121a, 121b and lower tab section 127 toward the X direction positioning sections 135a to 135c.

Other arrangements and operations of the holding structure for the first free-form curved mirror 16 are similar to those of the holding structure for the second free-form curved mirror 17 described above.

In the holding structure for an optical element according to the present embodiment, the gaps "Lscx", "Lscy", and "Lscz" between the free-form curved mirrors 16, 17 and the displacement restricting sections 49, 57, 37b, 43, 148, 156, 137b, and 143 is set such that the deformations of the spring pieces 50a, 50b, 51, 58, 150a, 150b, 151, and 158 remain within the elastic range when the free-form curved mirrors 16, 17 move against the biasing forces of the spring pieces to be in contact with the displacement restricting sections. Therefore, the free-form curved mirrors 16, 17 can be held securely and with a high degree of reliability even when the relatively large load acts thereon due to the impact caused by the falling or the like.

The present invention is not limited to the embodiment described above, and may be subjected to various modifications. For example, the elastic biasing sections for biasing the optical element are not limited to pressure spring pieces such as those of the embodiment, and various plate springs, coil springs, and so on can be employed. Further, the shape and arrangement of the positioning sections and displacement restricting sections are not limited to those of the embodiment, and these sections may be shaped so as to contact the optical element in any of point contact, line contact, and surface contact. Furthermore, there are no particular limitations on the parts of the optical element contacted by these sections, as long as the contacting parts do not interfere with the optical surface of the optical element.

Further, the present invention was described regarding the holding structure for the free-form curved mirrors in the projection optical system of the rear-projection TV, but the present invention is not limited to the free-form curved mirror, and may be applied to another reflective or half mirror such as a spherical mirror or an aspherical mirror, another optical element such as a lens, and an optical system other than the projection optical system of the rear-projection TV. The optical elements to which the present invention is applicable include at least a reflective mirror having a free-form curved surface and a deflective optical element having a free-form curved surface.

What is claimed is:

1. A holding structure for an optical element, comprising:
an elastic biasing section for elastically biasing an optical element;
a positioning section disposed opposite to the elastic biasing section with respect to the optical element in a biasing direction of the elastic biasing section, the optical element being pressed against the positioning section by the elastic biasing section so as to be positioned; and
a displacement restricting section disposed opposite to the positioning section with respect to the optical element in the biasing direction and opposed to the optical element in the biasing direction with a gap,
wherein the gap is set such that deformation of the elastic biasing section remains within an elastic range when the optical element moves against a biasing force of the elastic biasing section to come into contact with the displacement restricting section.

2. The holding structure according to claim 1, wherein the gap between the optical element and the displacement restricting section and a distance between the positioning section and the displacement restricting section in the biasing direction is set so as to satisfy the following relationship:

$$Lsc > \frac{60 \text{ km} \times Lm}{1 + 60 \text{ km}}$$

where: "Lsc" is the gap between the optical element and the displacement restricting section in the biasing direction;
"Lm" is the distance between the positioning section and the displacement restricting section in the biasing direction; and
"km" is a linear expansion coefficient of a material constituting the optical element.

3. The holding structure according to claim 1, wherein the elastic biasing section includes at least any one of an X direction elastic biasing section the biasing direction of which is an X direction, a Y direction elastic biasing section the biasing direction of which is a Y direction, and a Z direction elastic biasing section the biasing direction of which is a Z direction, the X direction being substantially perpendicular to an optical surface of the optical element and the Y and Z directions being perpendicular to the X direction and perpendicular to each other.

4. The holding structure according to claim 3, wherein the displacement restricting section includes at least any one of an X direction displacement restricting section, a Y direction displacement restricting section, and a Z direction displacement restricting section, and
wherein any one of the X, Y, and Z direction elastic biasing section is provided on an identical member to any one of the X, Y, and Z direction displacement restricting sections.

5. The holding structure according to claim 1, wherein the optical element is provided with a tab section,
wherein a first portion of the tab section is pressed against the positioning section by the elastic biasing section, and
wherein a second portion of the tab section on the opposite side to the first portion in the biasing direction is opposed to the displacement restricting section with the gap.

6. The holding structure according to claim 1, wherein the optical element is provided with a tab section,
wherein the tab section is pressed against the positioning section by the elastic biasing section, and
wherein a part of the optical element other than the tab section is opposed to the displacement restricting section with the gap.

7. The holding structure according to claim 3, wherein the optical element is provided with three X direction attachment reference sections serving as attachment references in the X direction and three tab sections protruding from a peripheral edge thereof,
wherein the tab sections are provided with a Y direction attachment reference section and a Z direction attachment reference section respectively serving as attachment references in the Y and Z directions,
wherein the positioning section includes three X direction positioning sections to which the three X direction attachment reference sections are abutted and three Y and Z direction positioning sections to which the Y and X attachment reference sections are abutted, band
wherein the elastic biasing section includes three X direction pressure springs for biasing the three X direction attachment reference sections of the optical element toward the three X direction positioning sections, three Y and X direction pressure springs for biasing the three Y and Z direction attachment reference sections to the optical element toward the three Y and Z direction positioning sections.

8. A projection unit, comprising:
a projection optical system for projecting an image light from an image forming element, including at least one optical element having optical power; and
a holding structure for elastically holding the optical element,
wherein the holding structure comprises:
an elastic biasing section for elastically biasing the optical element;
a positioning section disposed opposite to the elastic biasing section with respect to the optical element in a biasing direction of the elastic biasing section, the optical element being pressed against the positioning section by the elastic biasing section so as to be positioned; and
a displacement restricting section disposed opposite to the positioning section with respect to the optical element in the biasing direction and opposed to the optical element in the biasing direction with a gap,
wherein the gap is set such that deformation of the elastic biasing section remains within an elastic range when the optical element moves against a biasing force of the elastic biasing section to come into contact with the displacement restricting section.

9. The projection unit according to claim 8, wherein the gap between the optical element and the displacement restricting section and a distance between the positioning section and the displacement restricting section in the biasing direction is set so as to satisfy the following relationship:

$$Lsc > \frac{60 \text{ km} \times Lm}{1 + 60 \text{ km}}$$

where: "Lsc" is the gap between the optical element and the displacement restricting section in the biasing direction;
"Lm" is the distance between the positioning section and the displacement restricting section in the biasing direction; and
"km" is a linear expansion coefficient of a material constituting the optical element.

10. The projection unit according to claim 8, wherein the elastic biasing section includes at least any one of an X direction elastic biasing section the biasing direction of which is an X direction, a Y direction elastic biasing section the biasing direction of which is a Y direction, and a Z direction elastic biasing section the biasing direction of which is a Z direction, the X direction being substantially perpendicular to an optical surface of the optical element and the Y and Z directions being perpendicular to the X direction and perpendicular to each other.

11. The projection unit according to claim 10, wherein the displacement restricting section includes at least any one of an X direction displacement restricting section, a Y direction displacement restricting section, and a Z direction displacement restricting section, and
wherein any one of the X, Y, and Z direction elastic biasing section is provided on an identical member to any one of the X, Y, and Z direction displacement restricting sections.

12. The projection unit according to claim 8, wherein the optical element is provided with a tab section,
wherein a first portion of the tab section is pressed against the positioning section by the elastic biasing section, and
wherein a second portion of the tab section on the opposite side to the first portion in the biasing direction is opposed to the displacement restricting section with the gap.

13. The projection unit according to claim 8, wherein the optical element is provided with a tab section,
wherein the tab section is pressed against the positioning section by the elastic biasing section, and
wherein a part of the optical element other than the tab section is opposed to the displacement restricting section with the gap.

14. The projection unit according to claim 10, wherein the optical element is provided with three X direction attachment reference sections serving as attachment references in the X direction and three tab sections protruding from a peripheral edge thereof,
wherein the tab sections are provided with a Y direction attachment reference section and a Z direction attachment reference section respectively serving as attachment references in the Y and Z directions,
wherein the positioning section includes three X direction positioning sections to which the three X direction attachment reference sections are abutted and three Y and Z direction positioning sections to which the Y and X attachment reference sections are abutted, and
wherein the elastic biasing section includes three X direction pressure springs for biasing the three X direction attachment reference sections of the optical element toward the three X direction positioning sections, three Y and X direction pressure springs for biasing the three Y and Z direction attachment reference sections to the optical element toward the three Y and Z direction positioning sections.

15. The projection unit according to claim 8, wherein the optical element is a reflective mirror having a free-form curved surface.

* * * * *

UNITED STATES PATENT AND TRADEMARK OFFICE
CERTIFICATE OF CORRECTION

PATENT NO.       : 7,800,050 B2                                                       Page 1 of 1
APPLICATION NO. : 12/002214
DATED            : September 21, 2010
INVENTOR(S)      : Satoshi Onishi, Atsushi Matsuura and Shinichi Suzuki It is certified that error appears in the above-identified patent and that said Letters Patent is hereby corrected as shown below:

Cover Page, Title (54):
Line 4, delete "SECTION (AS AMNEDED)" and insert -- SECTION --.

Column 1:
Line 4, delete "SECTION (AS AMNEDED)" and insert -- SECTION --.

Column 16:
Line 36, printed claim 7, delete "dand" and insert -- and --.

Signed and Sealed this

Twenty-first Day of December, 2010

David J. Kappos
*Director of the United States Patent and Trademark Office*